(12) United States Patent
Vassar

(10) Patent No.: US 8,366,435 B2
(45) Date of Patent: Feb. 5, 2013

(54) EXTRUSION BLOW MOLD SYSTEM

(76) Inventor: James Vassar, West Chicago, IL (US)

( * ) Notice: Subject to any disclaimer, the term of this patent is extended or adjusted under 35 U.S.C. 154(b) by 218 days.

(21) Appl. No.: 12/821,775

(22) Filed: Jun. 23, 2010

(65) Prior Publication Data

US 2010/0278960 A1 Nov. 4, 2010

Related U.S. Application Data

(63) Continuation-in-part of application No. 11/895,936, filed on Aug. 28, 2007, now abandoned.

(51) Int. Cl.
*B29C 49/04* (2006.01)
*B29C 49/30* (2006.01)
*B29C 49/56* (2006.01)

(52) U.S. Cl. ......... 425/527; 425/532; 425/538; 425/541

(58) Field of Classification Search .................. 425/522, 425/527, 532, 538, 541; 264/536
See application file for complete search history.

(56) References Cited

U.S. PATENT DOCUMENTS

| | | | |
|---|---|---|---|
| 3,072,240 A * | 1/1963 | Allgeyer | 425/537 |
| 3,091,803 A * | 6/1963 | Scott, Jr. et al. | 425/532 |
| 3,251,673 A | 5/1966 | Brymer, Jr. | |
| 3,718,724 A * | 2/1973 | Holzmann et al. | 264/533 |
| 5,169,654 A | 12/1992 | Koga | |
| 5,486,103 A * | 1/1996 | Meiring et al. | 425/541 |
| 5,551,861 A * | 9/1996 | Baldi | 425/527 |
| 5,562,934 A | 10/1996 | Langos et al. | |
| 5,705,121 A | 1/1998 | Allred, Jr. | |
| 5,976,452 A | 11/1999 | Meyer | |
| 6,036,472 A | 3/2000 | Boudreau et al. | |
| 6,102,685 A | 8/2000 | Miura et al. | |
| 6,106,265 A | 8/2000 | Von Holdt | |
| 6,692,686 B1 * | 2/2004 | Gonda et al. | 425/538 |
| 6,923,636 B2 | 8/2005 | Langos et al. | |
| 2010/0239706 A1 * | 9/2010 | Pavan | 425/532 |

\* cited by examiner

*Primary Examiner* — Robert B Davis
(74) *Attorney, Agent, or Firm* — Wood, Phillips, Katz, Clark & Mortimer

(57) ABSTRACT

A mold unit has first and second parts, each with a plurality of cooperating cavity portions. The mold unit further has similarly interconnected third and fourth mold parts. An operating system moves the mold parts to change the mold unit between first and second states. The first and third mold parts meet at a fixed, first parting line to define a first plurality of mold cavities, and the second and third mold parts meet at a fixed, second parting line to define a second plurality of cavities with the mold unit in the first state. In the second state, molded products formed from the parisons can be released from their cavities.

25 Claims, 19 Drawing Sheets

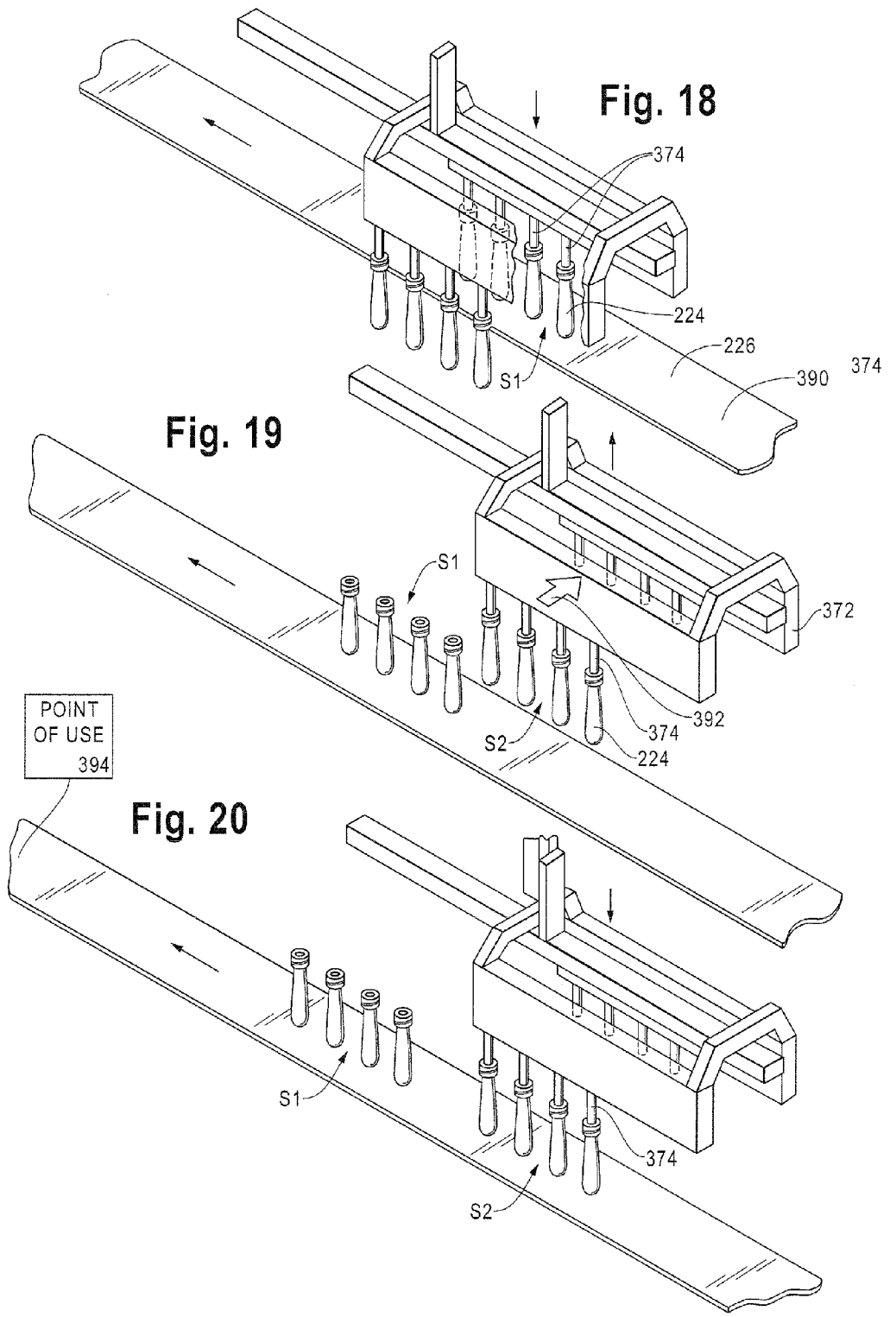

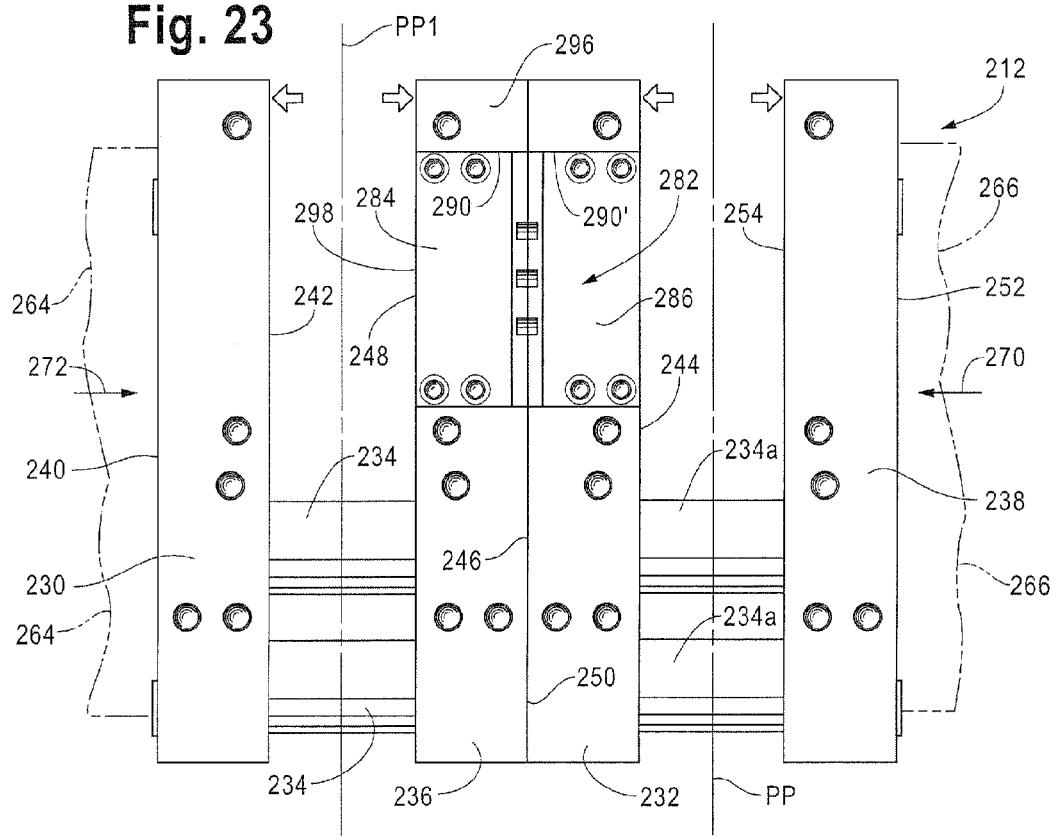
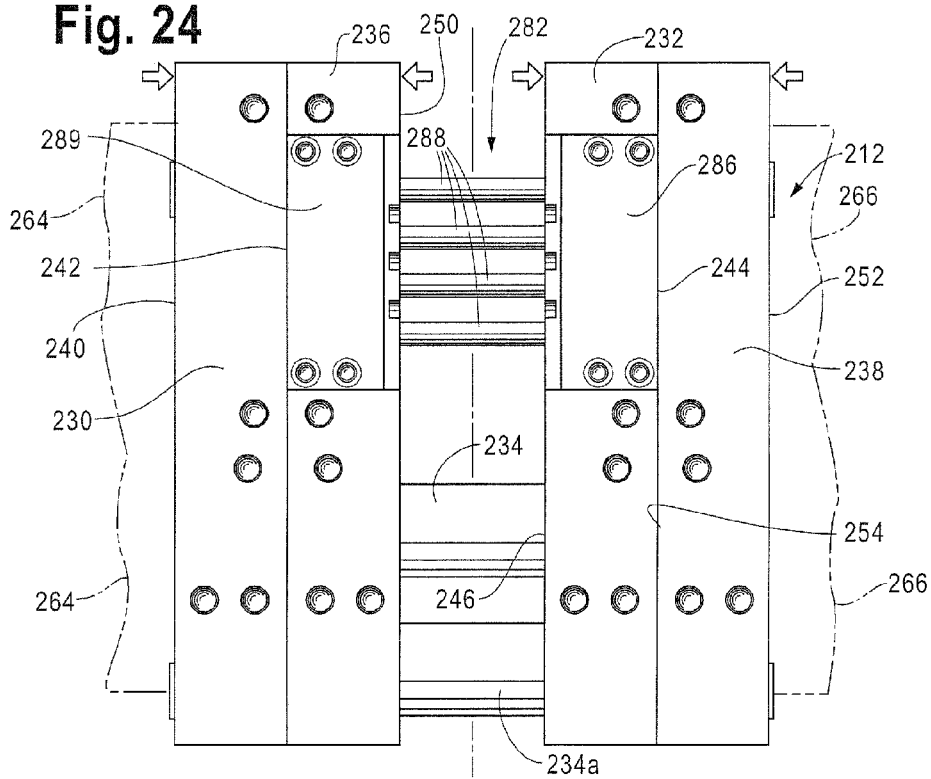

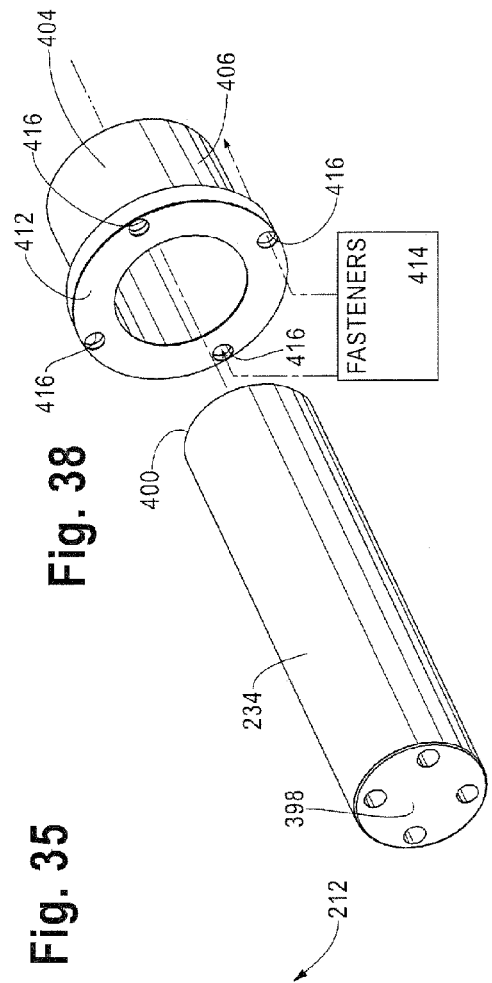
Fig. 35
Fig. 38
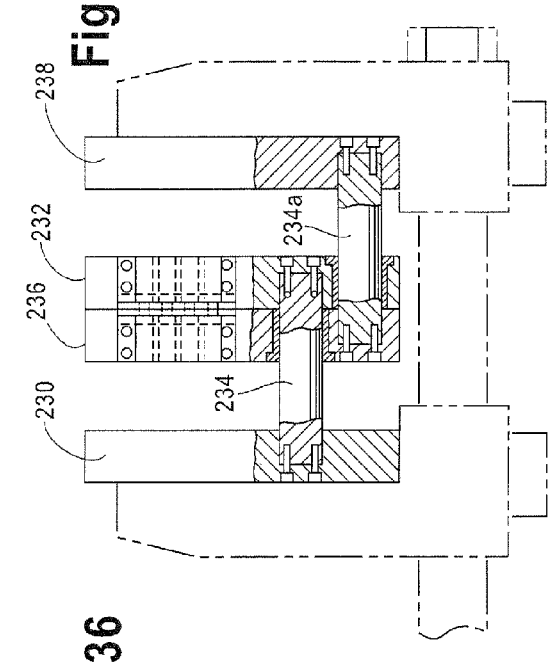
Fig. 37
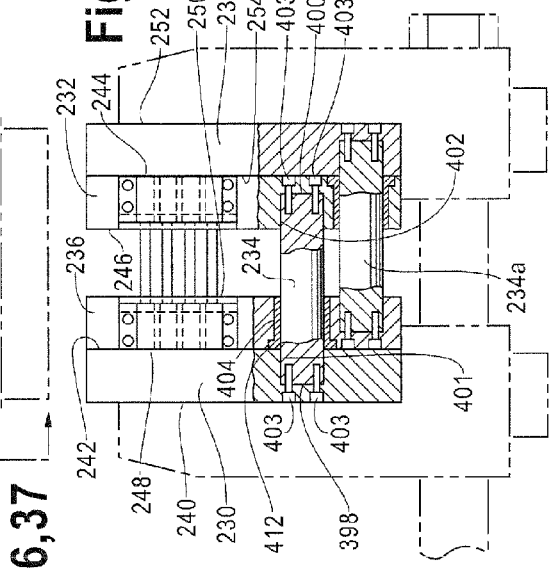
Fig. 36

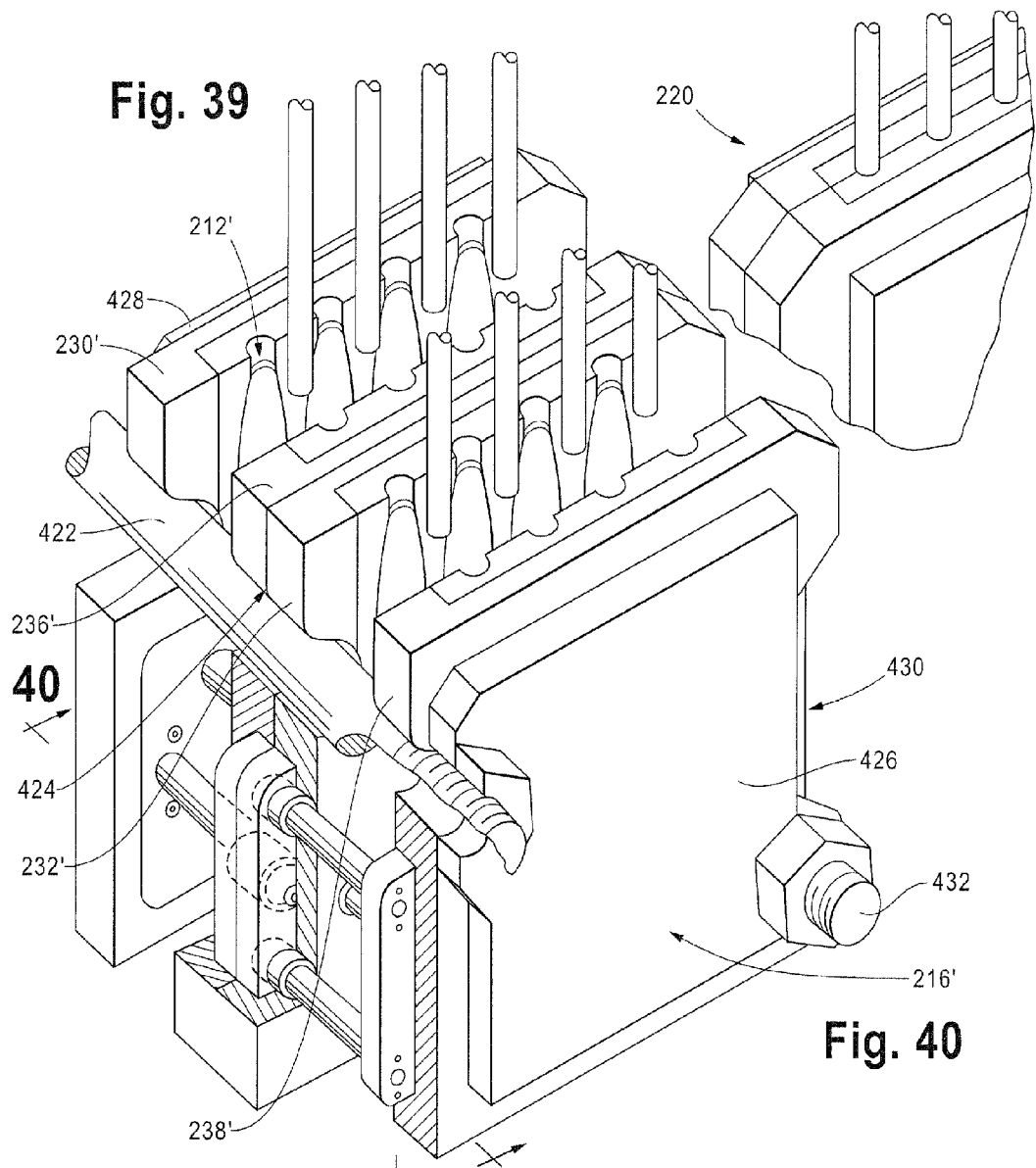
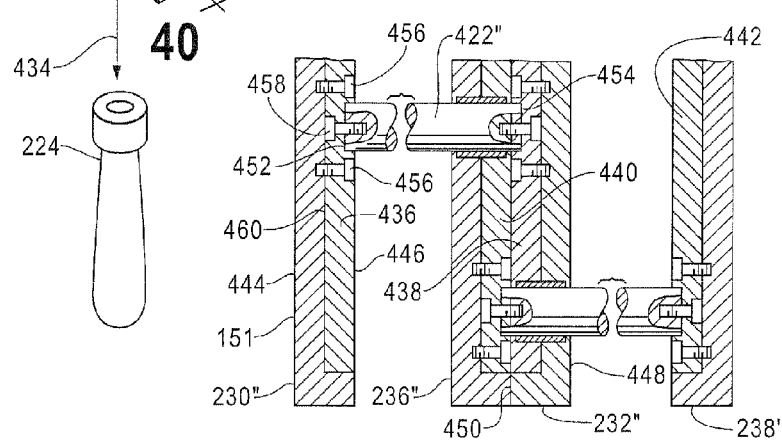
Fig. 39
Fig. 40

EXTRUSION BLOW MOLD SYSTEM

CROSS-REFERENCE TO RELATED APPLICATIONS

This application is a continuation-in-part of U.S. Ser. No. 11/895,936 filed Aug. 28, 2007.

BACKGROUND OF THE INVENTION

1. Field of the Invention

This invention pertains to extrusion blow molding, and in more particular applications, to extrusion blow molding multiple rows of extruded parisons.

2. Background Art

Blow molding is a process whereby hollow plastic parts, such as drink bottles and other containers, are formed. One form of blow molding, extrusion blow molding, is performed whereby plastic materials are melted and extruded into a hollow tube known as a parison. The parison is positioned within a mold, which is generally metal and may be cooled. Once located within the mold, a fluid, such as air, is blown into the parison, inflating it to conform to the shape of the mold. After the molded part is sufficiently cool, the mold is opened and the part removed.

Generally, there are two main categories of extrusion blow molding forms; continuous extrusion and intermittent extrusion. Continuous extrusion processes include shuttle-type machines and rotary wheel machines. Intermittent extrusion processes include reciprocating screw machines and accumulator head machines.

These extrusion blow molding processes can be practiced to extrude and form single and multiple extruded parisons. However, when multiple parisons are extruded and formed at the same time, they generally have been extruded and formed in a single row.

Furthermore, conventional extrusion blow molding machines are generally very large and require significant floor space. Oftentimes, to increase product output, a manufacturer will have to increase the number of cavities for the parisons by adding cavities in the existing single row and/or adding a second extrusion blow molding machine. However, manufacturers are reluctant to increase the size of the machines and/or add additional machines because of space constraints.

Another problem with extrusion blow mold systems involves the handling of the products after they are formed in the mold cavities. To assure that relatively movable mold parts are stably and consistently supported, and can be positively pressed against each other while maintaining consistent alignment, it is common to provide multiple guide bars that are situated at different vertical heights. One or more of the bars may obstruct horizontal shifting of the molded products away from the mold parts defining the forming cavities. As a result, the molded products are commonly required to be discharged downwardly, where they are accumulated at a staging location, typically in an unordered fashion. The molded products must subsequently be re-engaged, stripped of any flash, and moved to an appropriate point of use, be it a further staging area, a packing location, etc. Operation in this manner generally results in an inefficient use of space and is also generally time inefficient.

Another problem with certain extrusion blow mold systems involves separation of the molded products from their respective cavities. In one known construction, molded products are released by moving one of the mold parts with cavity portions relative to a stationary mold part defining a complementary cavity portion arrangement. With this system configuration, provision must be made to shift the molded products away from the stationary mold part after the mold is open. This complicates the overall structure and also potentially lengthens cycle time.

Mold systems of the above type are generally required to be made with a robust construction to allow controlled repositioning of mold parts and positive maintenance of the mold parts in engaged relationship as parts are formed. After numerous running cycles, wear, particularly on relatively movable parts, may manifest itself through an altered product formation or, in a worst case, a system failure that may result in down time and potentially expensive repairs. Thus, designers of mold systems must balance the oft-times competing objectives of producing heavy duty reliable systems and offering such systems so that they are economically practical to purchase, maintain, and repair.

With the increasingly competitive market for molded products, designers of the systems to produce those products have been challenged to continuously improve the designs thereof.

SUMMARY OF THE INVENTION

In one form, the invention is directed to an extrusion blow mold system including a first mold part having a first plurality of cavity portions and a second mold part having a second plurality of cavity portions. The first mold part and second mold part are interconnected to move as one piece in opposite directions in a first travel path. The system further includes a third mold part having a third plurality of cavity portions and a fourth mold part having a fourth plurality of cavity portions. The third mold part and fourth mold part are interconnected to move as one piece in opposite directions in a second travel path. The first, second, third and fourth mold parts together make up a first mold unit. The blow mold system further has an operating system for the first mold unit through which the mold parts are moved in their respective travel paths to thereby change the first mold unit between first and second states. The first and third mold parts meet at a first parting line so that the cavity portions in the first plurality of cavity portions align one each with the cavity portions in the third plurality of cavity portions to define a first plurality of cavities, each to receive a parison with the first mold unit in the first state. The second and third mold parts meet at a second parting line so that the cavity portions in the second plurality of cavity portions align one each with the cavity portions in the fourth plurality of cavity portions to define a second plurality of cavities, each to receive a parison, with the first mold unit in the first state. The mold parts are relatively positioned through the operating system to place the first mold unit in the second state to allow molded products formed from the parisons to be released from their respective cavities.

In one form, the first and third mold parts are moved away from each other and the first parting line as the first mold unit is changed from the first state into the second state.

In one form, the second and fourth mold parts are moved away from each other and the second parting line as the first mold unit is changed from the first state into the second state.

In one form, the first and second parting lines are straight, fixed lines that are substantially parallel and spaced from each other and the cavities in the first plurality of cavities are spaced from each other in a direction parallel to the parting lines.

In one form, a force applying mechanism acts between the second and third mold parts to urge the second and third mold parts away from each other and thereby urge the second mold part against the fourth mold part and the third mold part against the first mold part with the first mold unit in the first state.

In one form, the first, second, third and fourth mold parts are interconnected by at least one guide rod on the first mold unit. The blow mold system is provided in combination with a second mold unit having only two mold parts that are joined by at least one guide rod. The first and second mold units are selectively operably mountable, one in place of the other, to the operating system and usable to form molded products with the selected mold unit.

In one form, the first and third mold parts each has a top and bottom, an upstream end and a discharge end. Products molded in the first plurality of cavities have a molded orientation. With the first mold unit in the second state there is no structure between the first and third mold parts that obstructs products molded in the first plurality of cavities and maintained in the molded orientation from moving along the first parting line to and past the discharge end of the first and third mold parts.

In one form, the cavity portions each has a bottom and there is no structure between the first and third mold parts above the bottoms of the cavity portions between the upstream and discharge ends of the first and third mold parts with the first mold unit in the second state.

In one form, the extrusion blow mold system further includes first and second trimming section plates respectively movable as one piece with, and at the downstream ends of, the first and third mold parts. The first and second trimming section plates are configured to capture parts molded in the first plurality of cavities and maintained in the molded orientation with the first mold unit in the first state.

In one form, there is a plurality of guide bars that each extends through the third mold part and partially through each of the first and second mold parts.

In one form, the first mold part has oppositely facing first and second surfaces and the second mold part has oppositely facing third and fourth surfaces. The first plurality of cavity portions is formed at the second surface and the second plurality of cavity portions is formed at the fourth surface. A first guide bar in the plurality of guide bars has spaced ends. One of the spaced ends is directed through the second surface into the first mold part. At least one fastener is directed through the first surface and into the one spaced end of the first guide bar. The other of the spaced ends is directed through the fourth surface into the second mold part. At least one fastener is directed through the third surface into the other of the spaced ends.

In one form, a bushing is provided on the third mold part and the first guide bar extends through the bushing.

In one form, the third mold part has oppositely facing surfaces, the bushing has an enlarged flange that is flush with one of the oppositely facing surfaces on the third mold part, and at least one fastener is directed through the enlarged flange and into the third mold part to releasably maintain the bushing on the third mold part.

In one form, the force applying mechanism includes first and second blocks, provided one each on the second and third mold parts, with at least one rod extending between each of the first and second blocks.

In one form, the second and third mold parts have facing surfaces that confront each other with the first mold unit in the second state. The first and second blocks are mounted respectively in first and second receptacles formed one each through the facing surfaces on the second and third mold parts.

In one form, the force applying mechanism is hydraulically operated and changeable between extended and retracted states. The at least one rod is moved relative to each of the first and second blocks as the force applying mechanism is changed between the extended and retracted states.

In one form, the first and third mold parts are each moved away from the first parting line an equal first distance as the first mold unit is changed from the first state into the second state.

In one form, the second and fourth mold parts are each moved away from the second parting line the first distance as the first mold unit is changed from the first state into the second state.

In one form, the first mold part has oppositely facing first and second surfaces and the second mold part has oppositely facing third and fourth surfaces. The first plurality of cavity portions is formed at the second surface and the second plurality of cavity portions is formed at the fourth surface. An inset wear insert defines a part of one of the second and fourth surfaces. A first guide bar in the plurality of guide bars has spaced ends, and one of the spaced ends is directed into the inset wear insert. At least one fastener is directed through the inset wear insert into the one spaced end of the first guide bar.

BRIEF DESCRIPTION OF THE DRAWINGS

FIGS. 18-20 are enlarged, perspective views of a carrier saddle on the system in FIGS. 16 and 17 that is shown sequentially delivering molded products to a conveyor belt;

FIG. 23 is an end elevation view of the mold unit in FIGS. 21 and 22 in an open state;

FIG. 24 is a view as in FIG. 23 with the mold unit in a closed state;

FIGS. 30', 31' and 32' are cross-sectional views taken along lines 30'-30', 31'-31', and 32'-32' in FIGS. 30, 31 and 32, successively, and showing the progressive steps for removing flash from a formed product;

FIG. 35 is a side elevation view of the inventive mold unit operatively mounted between clamp units shown in dotted lines;

FIG. 36 is a cross-sectional view of the mold unit taken along line 36-36 of FIG. 35;

FIG. 37 is a cross-sectional view of the mold unit taken along line 37-37 of FIG. 35;

FIG. 38 is an enlarged, exploded, perspective view of a guide bar for mold parts on the mold unit in FIGS. 35-37 and in relationship to a bushing through which the guide bar extends;

FIG. 39 is a perspective view of a modified form of mold unit, according to the present invention, and operatively associated with part of a conventional clamp unit designed to accept a single row mold unit, as shown in fragmentary perspective in FIG. 39; and FIG. 40 is a reduced, cross-sectional view of the mold unit taken along line 40-40 of FIG. 39.

DETAILED DESCRIPTION OF THE DRAWINGS

Figure 1:
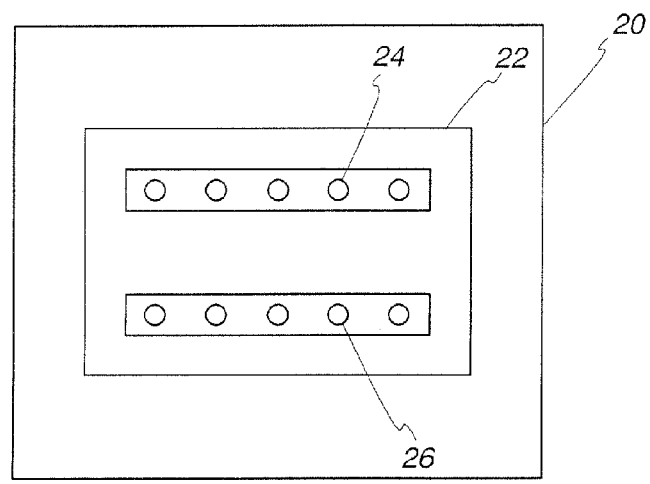
FIG. 1 is a block diagram of an extrusion blow molding machine.

In FIG. 1, an intermittent extrusion blow molding machine, such as an accumulator-type extrusion blow molding machine 20, is shown. As understood by those skilled in the art, with this form of extrusion blow molding machine, extrusion and blow molding steps are performed at a common location, such as at a station 22. The station 22 includes a first row and a second row of parisons 24, 26 which are extruded and then formed using a mold and blow pins (not shown).

Figure 2:
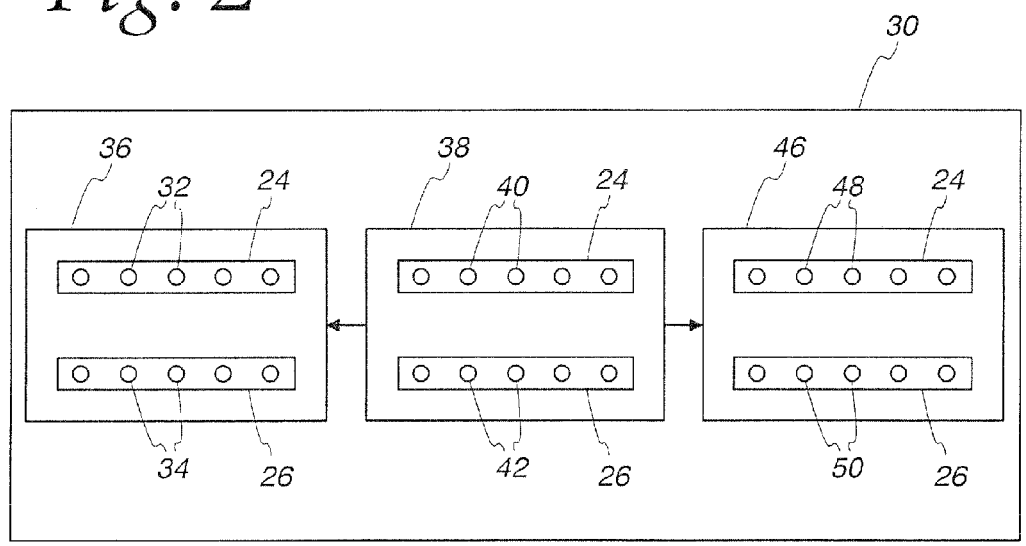
FIG. 2 is a block diagram of an alternative embodiment of an extrusion blow molding machine.

An alternative type of extrusion blow molding machine is illustrated in FIG. 2. FIG. 2 depicts a continuous extrusion machine, such as a shuttle-type extrusion blow molding machine 30. In this form, the first row of parisons 24 is extruded through a first row of openings 32 and the second row of parisons 26 is extruded through a second row of openings 34 at an extrusion station 36. A mold 38 shuttles to the extrusion station 36 and receives the first row of parisons 24 in a first row of cavities 40 and receives the second row of parisons 26 in a second row of cavities 42. The mold 38 then shuttles from the extrusion station 36 to a blow pin station 46. At the blow pin station 46, a first row of blow pins 48 will be inserted into the first row of parisons 24 in the first row of mold cavities 40. Similarly, a second row of blow pins 50 will be inserted into the second row of parisons 26 in the second row of mold cavities 42. Each of the blow pins in the first and second rows of blow pins 48,50 cooperates with the first and second mold cavities 40,42 whereby a fluid is blown therefrom into each of the parisons, forcing the parisons outwardly to conform to the shape of the respective blow mold cavities, as understood by those skilled in the art.

Figure 3:
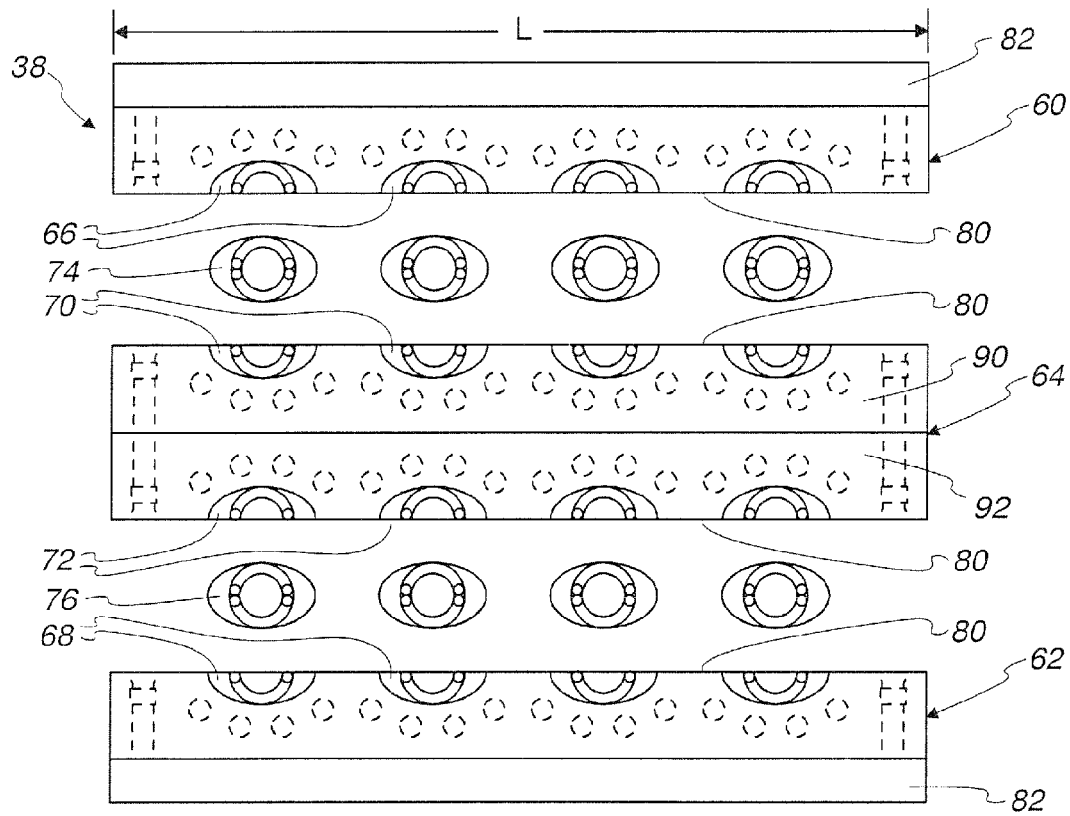
FIG. 3 is a top view of an extrusion blow mold in an open state.

One exemplary form of the mold 38 will now be discussed in more detail. It should be understood that the mold 38 is suitable for use in both types of extrusion blow molding machines 20, 30. Furthermore, the mold 38 may be utilized in other forms of extrusion blow molding machines as understood by those skilled in the art. The mold 38 is illustrated in FIG. 3 in an open state. In this embodiment, the mold 38 includes a first molding block section 60, a second molding block section 62 and a third molding block section 64. It should be understood that the molding block sections 60,62, 64, and therefore the resulting mold 38, may take a variety of shapes. In one form the molding block sections are generally rectangular and/or cylindrical extending along a length L and have a variety of cross-sectional shapes. The cross-sectional shapes of the molding block sections 60,62,64 include, but are not limited to squares, rectangles, circles and the like.

The first molding block section 60 includes a first plurality of cavity portions 66. Similarly, the second molding block section 62 includes a second plurality of cavity portions 68. The third molding block section 64 includes a third plurality of cavity sections 70 and a fourth plurality of cavity sections 72.

Figure 4:
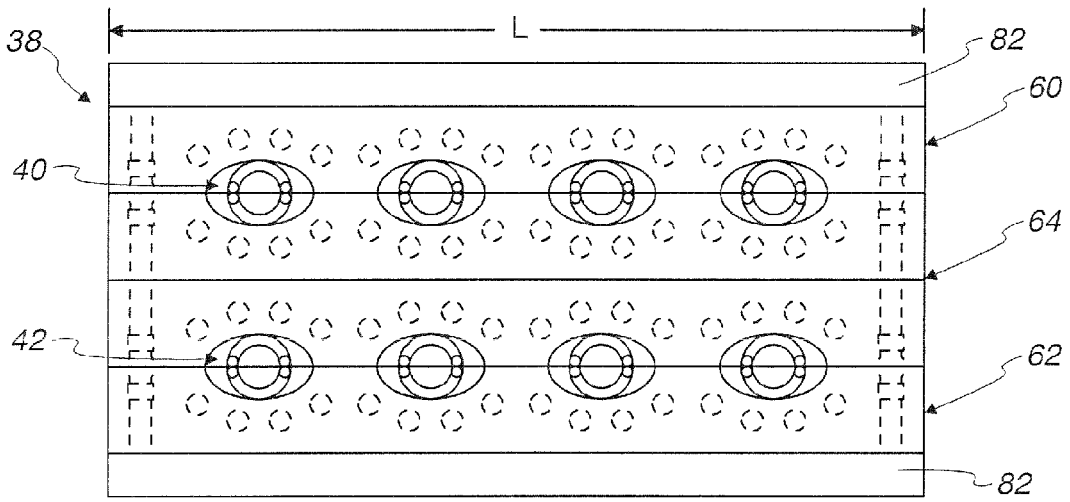
FIG. 4 is a top view of the extrusion blow mold of FIG. 3 in a closed state.

As illustrated in FIG. 4, the mold 38 of FIG. 3 is in a closed state. When in the closed state, the cavity portions 70 are alignable one each with the first plurality of cavity portions 66 to define the first row of cavities 40 extending along the length L. Similarly, when in the closed position, the cavity portions 72 are alignable one each with the second plurality of cavity portions to define the second row of cavities 42 extending along the length L, adjacent the first row 40. As shown in FIG. 3, after the parisons are molded, the mold 38 is placed again in the open state whereby a first row of molded products 74 and a second row of molded products 76 can be released from the mold 38.

Figure 5:
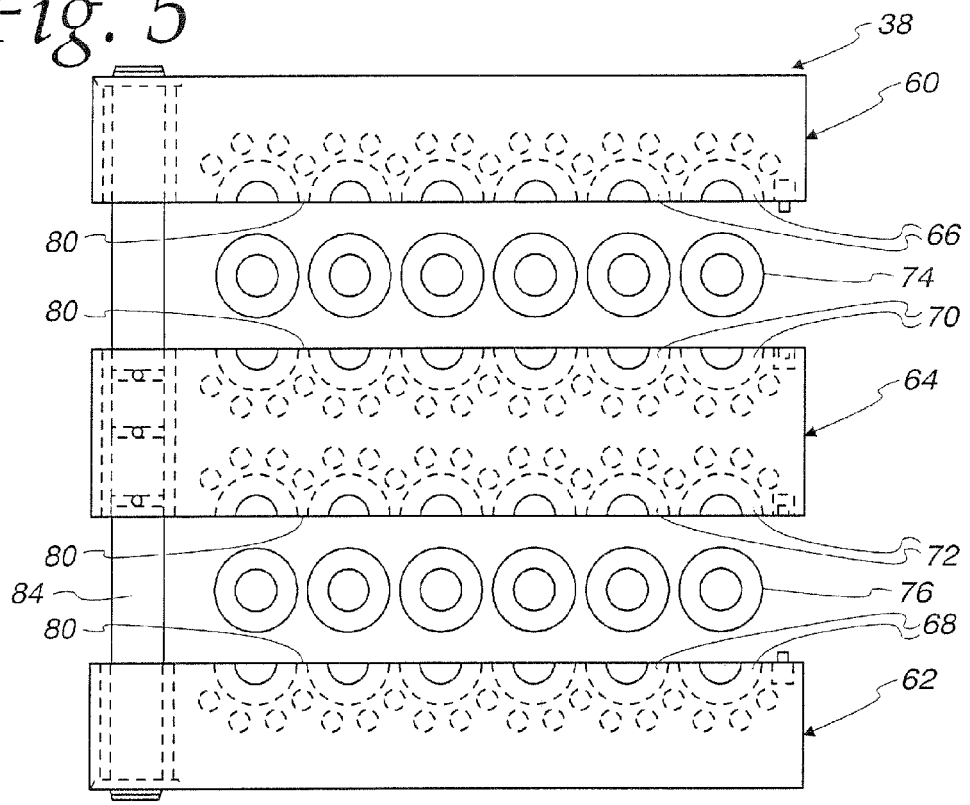
FIG. 5 is a top view of another extrusion blow mold in an open state.
Figure 6:
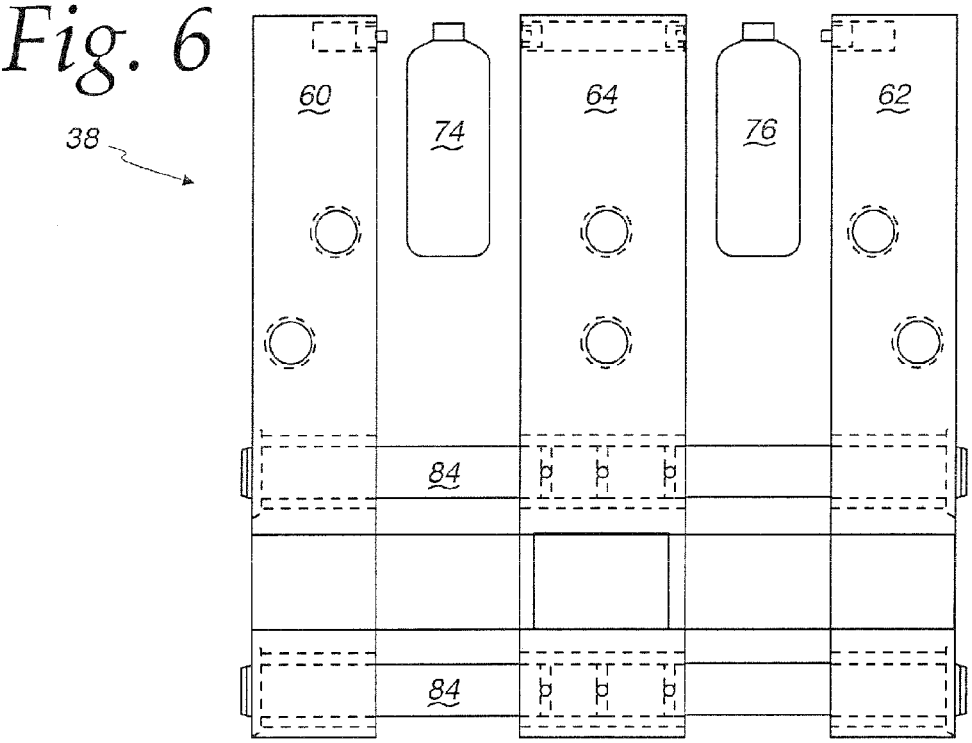
FIG. 6 is a side view of the extrusion blow mold of FIG. 5.
Figure 7:
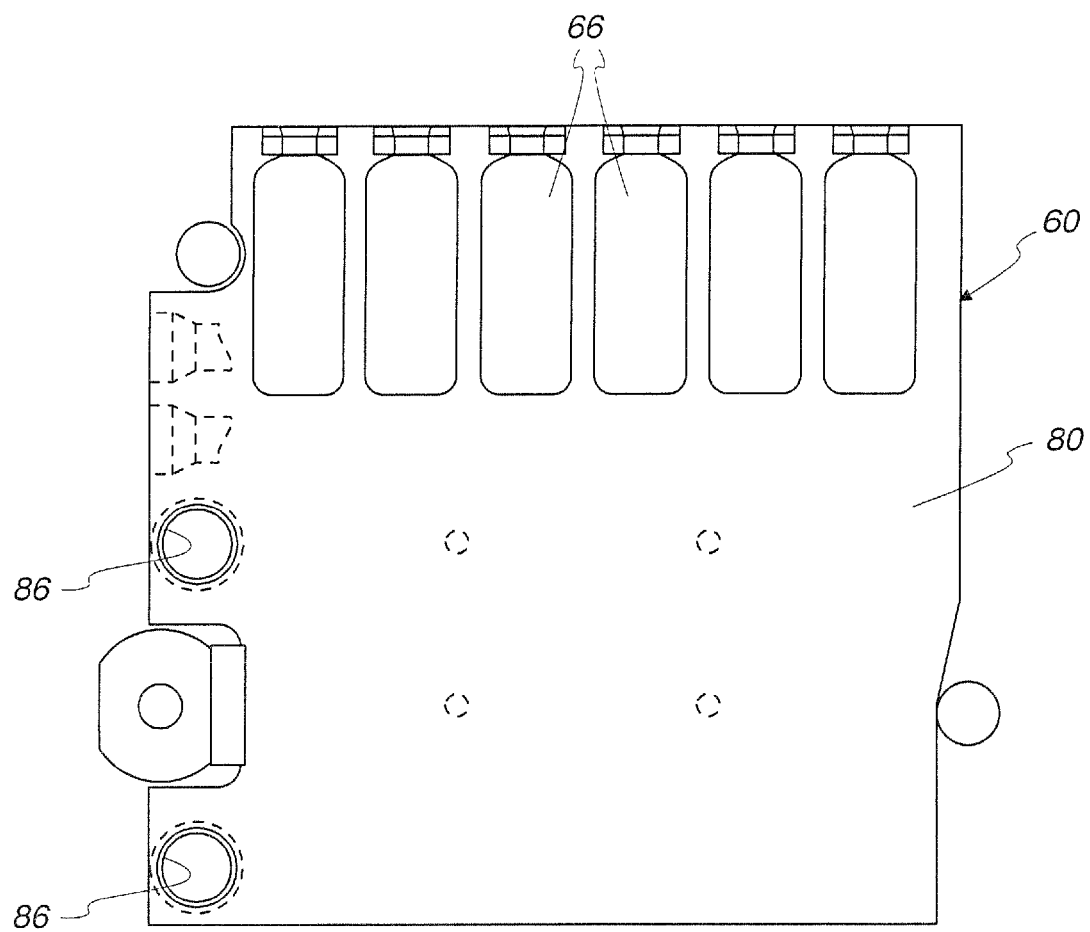
FIG. 7 is a side view of one molding block section of the extrusion blow mold of FIG. 5.

The respective rows of cavities 40,42 and cavity portions 66,68,70,72 may take a variety of shapes and forms. For example, as shown in FIGS. 3-4, the shapes are generally oval-shaped cylinders. In another example, as shown in FIGS. 5-7, the shapes are generally circular-shaped cylinders. It should be understood that the cavities 40,42 and cavity portions 66,68,70,72 may take a wide variety of shapes and orientations to produce a variety of molded products 74,76.

Furthermore, in one form, the respective pairs of cavity portions 66,70 and 68,72 are substantially mirror images of one another. However, it should be understood by those skilled in the art that the pairs cavity portions 66,70 and 68,72 need not be mirror images so that products of varying shapes and dimensions may be produced.

Analogously, in one form, the respective cavity portions 66,68,70,72 each makes up approximately half of the respective cavities 40,42. However, it should be understood by those skilled in the art that each of the cavity portions 66,68,70,72 may make up a different portion of each of the overall cavities 40,42. For example, the cavity portion 66 may form sixty-five percent of the overall cavity 40 while the cavity portion 70 forms thirty-five percent of the overall cavity 40. Therefore, the sizes and orientations of the molding block sections 60,62,64 may be adjusted as desired to accommodate the cavity portions 66,68,70,72.

As seen in FIGS. 3-7, each of the molding block sections 60,62,64 has at least one substantially flat face 80. In this regard, each of the faces 80 on the molding block sections 60,62,64 will contact the face 80 of the corresponding molding block section such that the faces 80 will appropriately seal the cavities 40,42 to form the products 74,76. However, it should be understood that the molding block sections 60,62, 64 as well as the faces 80 may take a variety of shapes. For example, the molding block section 64 may take a circular shape and therefore, the faces 80 of the molding block sections 60, 62 will have an arced shape to correspond to the circular shape. Other shapes for the molding block sections 60, 62, 64 and faces 80 are also contemplated as understood by those skilled in the art.

The mold 38 may also include additional features, such as platens 82, as seen in FIGS. 3-4. The platens 82 are located adjacent the molding block sections 60,62 to help retain the molding block sections 60,62 in the appropriate position as well as add rigidity to the mold 38. Furthermore, the platens 82 may be cooled and/or heated as desired to help cool and/or heat the mold 38 during the blow molding process.

Additionally, the mold 38 may include one or more guide rods 84, as illustrated in FIGS. 5-7, wherein the mold 38 is slightly modified from the form of the mold 38 in FIGS. 3 and 4, primarily by reason of the product shape that each is designed to form. The rods 84 pass through openings 86 in one or more of the molding block sections 60, 62, 64. The rods 84 can be used to help guide the molding block sections 60, 62, 64 as the mold 38 changes between the open and closed states. Furthermore, the rods 84 help maintain the molding block sections 60, 62, 64 in the desired orientations.

Furthermore, the third molding block section 64 may include multiple mold plates 90, 92 that are secured to one another, as shown in FIGS. 3-4. In this form, either of the plates 90, 92 is removable such that a new plate having the same or different sized/shaped cavity portions 70 or 72 may be inserted thereby permitting a different sized/shaped cavity 40 or 42 to be interchanged without modifying other of the cavities 40,42. In this regard, wear plates (not shown) may also be used in the mold 38 as understood by those skilled in the art.

As described above, the molding block sections 60, 62, 64 are movable relative to one another to substantially enclose the cavities 40,42 and mold the parisons. There are a variety of means available to provide movement for the molding block sections 60, 62, 64. In one form, the third molding block section 64 is held in place by a securing device (shown schematically) while the first and second molding block sections 60,62 are moved towards the third molding block section 64. In another form, the third molding block section 64 is not held by the securing device, but is still maintained in substantially the same position as a result of the respective movements of the first and second molding block sections 60, 62. However, it should be understood that the third molding block section 64 need not be held in place or remain in the same position.

Figure 8:
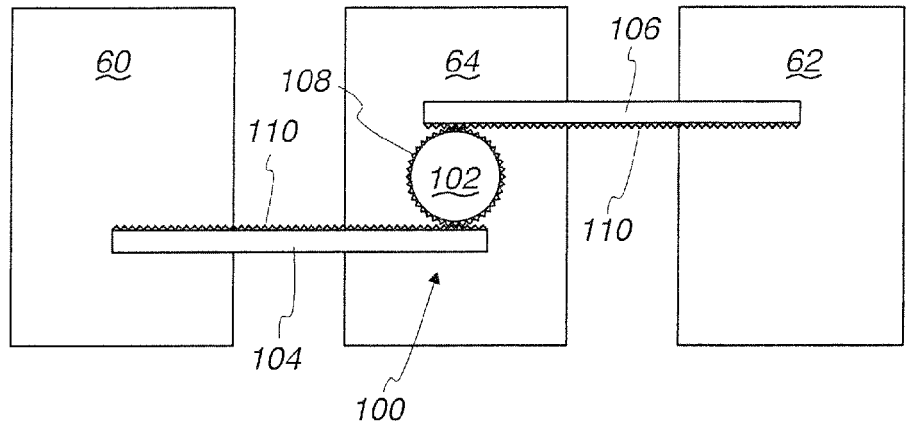
FIG. 8 is a side view of an extrusion blow mold including a rack and gear device.

As shown in FIG. 8, a rack and gear device 100 is included to relatively move the molding block sections 60, 62, 64. The rack and gear device 100 includes a rotating gear 102 located on the third molding block section 64. The rack and gear device 100 also includes a first toothed rack 104 extending from the first molding block section 60 and operably coupled to the rotating gear 102. The rack and gear device 100 further includes a second toothed rack 106 extending from the second molding block section 62 and operably coupled to the rotating gear 102. The first and second toothed racks 104,106 are secured to the respective molding block sections 60,62 in any conventional manner, such as by using bolts. The rotating gear 102 includes teeth 108 which cooperate with teeth 110 on the first and second toothed racks 104,106 such that when the rotating gear 102 rotates, the first and second molding block sections 60, 62 are brought towards or away from the third molding block section 64 depending on the direction of rotation of the gear 102. It should be understood that the rotating gear 102 and the first and second toothed racks 104, 106 may be located on any of the molding block sections 60, 62, 64 and/or may include multiple rack and gear devices 100. The rotating gear 102 may be powered by electric motors, hydraulics and other forms understood by those skilled in the art.

Figure 9:
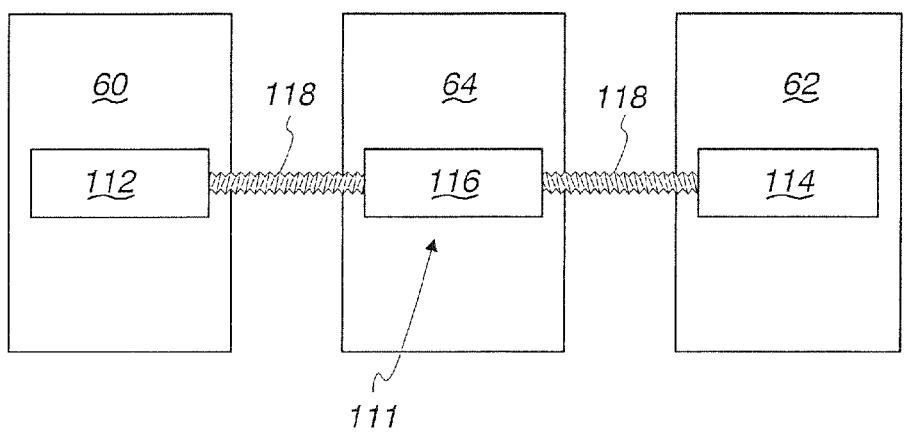
FIG. 9 is a side view of an extrusion blow mold including a helical gear device.

As shown in FIG. 9, a helical gear device 111 is included to relatively move the molding block sections 60, 62, 64. The helical gear device 110 includes a first nut 112 secured to the first molding block section 60 and a second nut 114 secured to the second molding block section 62. The helical gear device 110 further includes a bearing 116 secured to the third molding block section 64 and a helical gear 118 extending between the first and second nuts 112,114 through the bearing 116. The helical gear 118 can be rotated, such as at the bearing 116, which will cause the first and second molding block sections 60, 62 to move towards or away from the third molding block section 64 depending on the direction of rotation of the helical gear 118. It should be understood that the first and second nuts 112,114 and the bearing 116 may be located on any of the molding block sections 60,62,64 and/or may include multiple helical gear devices 110. The helical gear 118 may be powered by electric motors, hydraulics and other forms understood by those skilled in the art.

Figure 10:
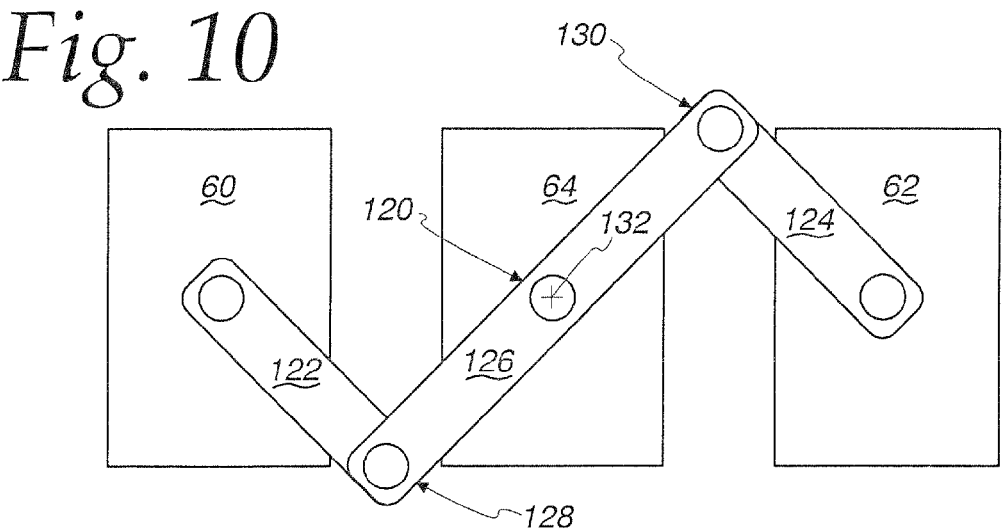
FIG. 10 is a side view of an extrusion blow mold including an harmonic arm device.

As shown in FIG. 10, an harmonic arm device 120 is included to relatively move the molding block sections 60, 62, 64. The harmonic arm device 120 includes a first arm 122 secured to the first molding block section 60, a second arm 124 secured to the second molding block section 62 and a third arm secured 126 secured to the third molding block section 64. The third arm 126 is secured at a first end 128 to the first arm 122 and secured at a second end 130 to the second arm 124. The third arm 126 is permitted to pivot about a pivot axis 132 such that as the third arm 126 pivots, the first and second molding block sections 60,62 move towards or away from the third molding block section 64 depending on the direction the third arm 126 pivots. It should be understood that the harmonic arm device 120 may also be configured to move only one molding block section 60,62,64 relative to another molding block section 60, 62, 64 such as through the use of multiple harmonic arm devices 120 and/or through an alternative configuration of the arms 122,124,126. The harmonic arm device 120 may be powered by electric motors, hydraulics and other forms understood by those skilled in the art.

It should be understood that other additional features may also be included as understood by those skilled in the art. For example, the mold may include mold release devices, takeout arms, conveyors and the like, as used in conventional extrusion blow molding machines. Furthermore, it should be understood that many existing single row extrusion machines may be retrofit with the mold 38 as described herein.

Figure 11:
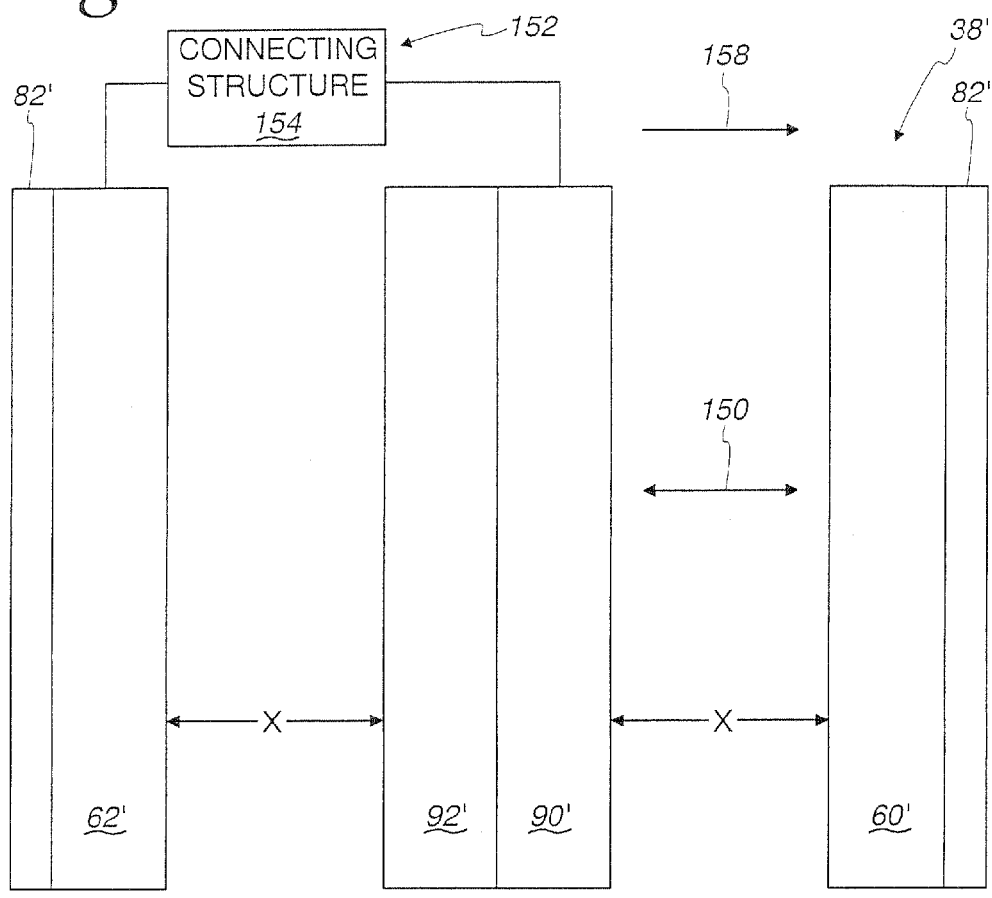
FIG. 11 is a schematic representation of a further modified form of extrusion blow mold in an open state.
Figure 12A:
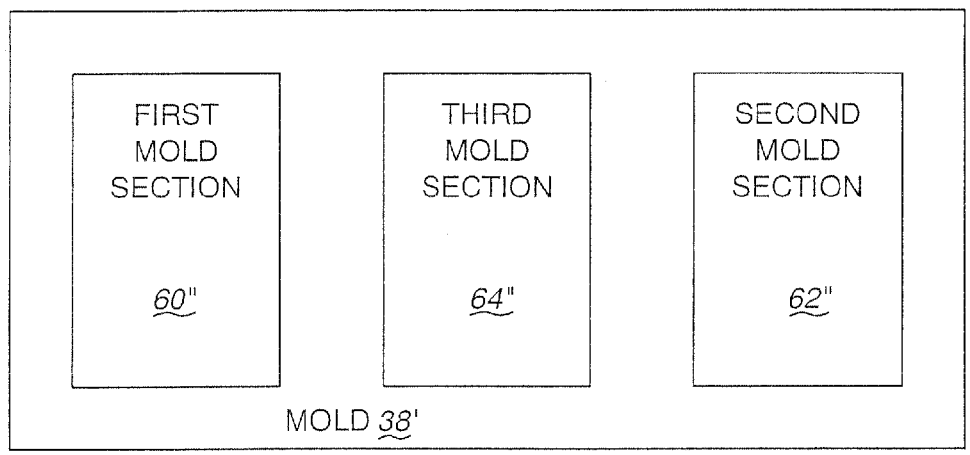
FIG. 12a is a schematic representation of an extrusion blow mold.
Figure 12:
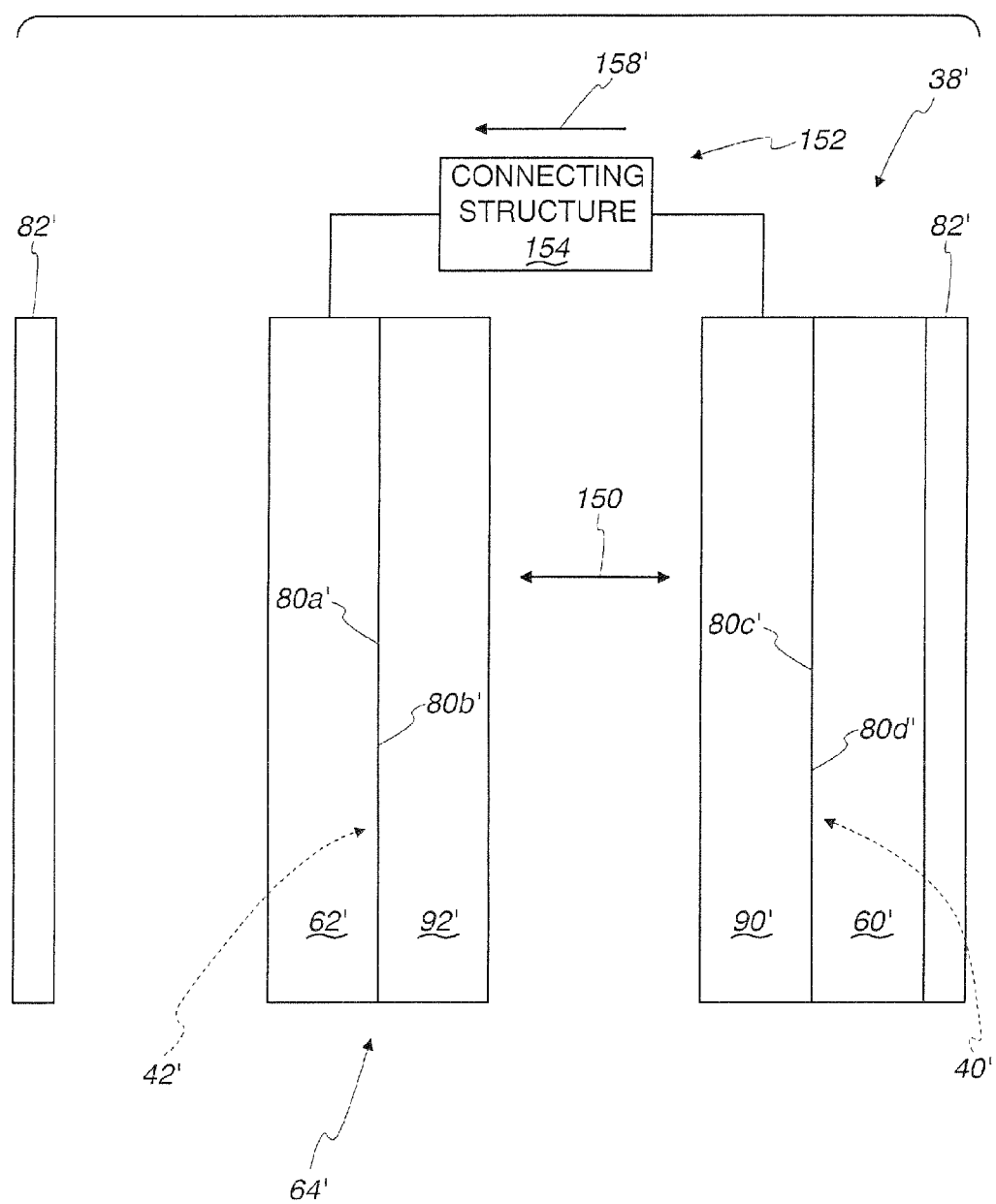
FIG. 12 is a view as in FIG. 11 with the extrusion blow mold in a closed state.

In FIGS. 11 and 12, a modified form of mold is shown schematically at 38', incorporating the same basic components for the mold 38, and with corresponding components identified with the same reference numeral and a "'" designation. That is, the mold 38' has mold plates 90', 92', corresponding to the mold plates 90, 92 making up the molding block section 64 on the mold 38. The mold plates 90', 92' together make up a corresponding molding block section 64'. Whereas the mold plates 90, 92 are at all times maintained together in abutting relationship on the mold 38, on the mold 38', the mold plate 90' is movable towards and away from the mold plate 92' along an operating line, indicated by the double-headed arrow 150, as the mold cavities 40', 42' are opened and closed. Additionally, whereas the mold section 62 is at all times maintained together in abutting relationship with the associated platen 82 on the mold 38, the mold section 62' is movable towards and away from its associated platen 82' along the operating line, as the mold cavities are opened and closed.

More specifically, the molding block section 62' and mold plate 90' are maintained to move together at all times as a fixed unit 152, along the operating line, by a connecting structure 154, that may take virtually an unlimited number of different forms, as understood by those skilled in this art. The unit 152 is movable along the operating line relative to the platens 82', mold plate 92', and molding block section 60', that maintain the same fixed relationship as the mold 38' changes between the different states in FIGS. 11 and 12.

In the open mold state of FIG. 11, the molding block sections 60', 62' are abutted to their respective platens 82', and the mold plates 90', 92' are abutted together. The actual abutting relationship of the above parts is not a requirement, however. The molding block section 62' and the mold plate 92', that have portions that combine to cooperatively define the mold cavities 42', are in spaced relationship along the operating line, as are the molding block section 60' and mold plate 90' that have portions that combine to cooperatively define the mold cavities 40'. In the open mold state of FIG. 11, the spacing between the molding block section 60' and mold plate 90' is the same as the spacing between the molding block section 62' and the mold plate 92', as indicated by the dimension X.

To change the mold 38' from the open state of FIG. 11 to the closed state of FIG. 12, the unit 152 is shifted in the direction of the arrow 158 along the operating line the distance X relative to the remaining components 82', 92', 60' to the closed state of FIG. 12. This brings faces 80a', 80b', respectively on the mold plate 92' and molding block section 62', into close abutting relationship to close the mold cavities 42' simultaneously as the faces 80c', 80d', respectively on the mold section 60' and mold plate 90', are brought into close abutting relationship to form the mold cavities 40'. The mold 38' is changed back into the open state by moving the unit 152 oppositely to the direction of the arrow 158, as indicated by the arrow 158' in FIG. 12, from the FIG. 12 position back into the FIG. 11 position.

The molding block section 60' is movable, as its counterpart 60 in FIGS. 3-5, towards and away from the mold plate 90'. This allows the molding block section 60' and the mold plate 90' to be moved towards and away from each other.

It should be appreciated that for all of the disclosed embodiments there are many possible modifications within the general arrangement of components shown in FIG. 12a. FIG. 12a schematically depicts a mold 38", corresponding generally to the molds 38, 38', and other variations depicted and otherwise devisable using the inventive concepts, and including first, second and third molding block sections 60", 62",64", corresponding generally to the molding block sections 60,62,64. The schematic representation is intended to encompass virtually an unlimited number of variations of the construction and relative movement of these basic components from those specifically shown and described herein, considered with the inventive concepts.

Additionally, it should be understood that the embodiments described herein may be utilized in a wide variety of extrusion blow molding machines having various shapes and orientations of molds.

Figure 13:
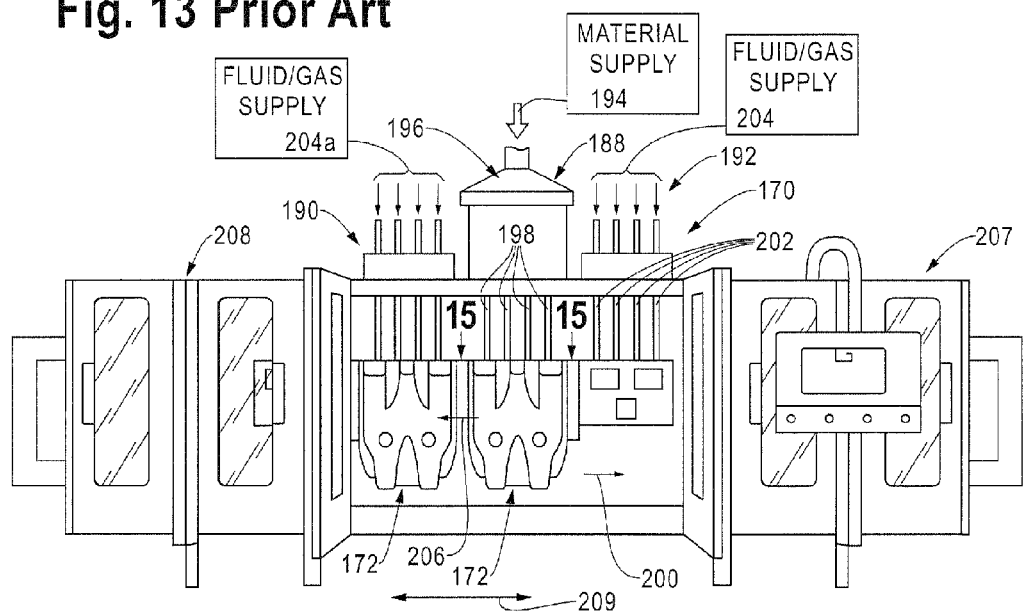
FIG. 13 is a front elevation view of a conventional shuttle-type blow molding system with two clamped mold units.
Figure 14:
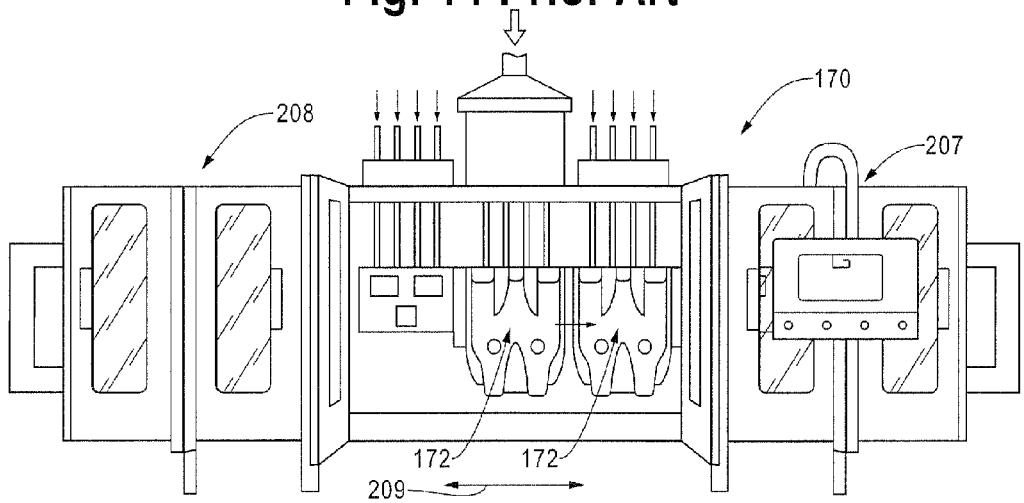
FIG. 14 is a view as in FIG. 13 with the mold units in different positions.
Figure 15:
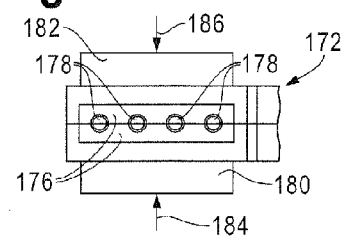
FIG. 15 is a plan view of one of the mold units between two clamp parts.

In FIGS. 13-15, a conventional extrusion blow mold system is shown at 170. At the center of the system 170, the product formation components are shown in a shuttle-type configuration as in FIG. 2, above. The system 170 utilizes two molds 172 of like configuration. Each mold 172 consists of mold parts 174, 176 that cooperate to produce, in this embodiment, four mold cavities 178.

In the closed state for each mold 172, mold parts 180, 182 are forcibly urged towards each other, as indicated by the separate arrows 184, 186.

The system 170 has three different stations, with a central, extrusion station 188 and separate blow pin stations 190, 192 between which the extrusion station 188 is located.

Extruded material from a supply 194 is delivered to a distribution component 196 from which the material is discharged in even volumes through four tubes 198 as parisons, directed one each into the cavities 178 of the mold 172 at the extrusion station 188. Once the parisons are delivered, the mold 172 at the extrusion station 188 in FIG. 13 is shifted in the direction of the arrow 200 to the blow pin station 192, at which the parison-filed cavities 178 locate one each below a like number of depending blow pins 202. Fluid/gas from a pressurized supply 204 is delivered into an open end of each parison through the blow pins 202.

Once the mold 172 vacates the extrusion station 188 and moves to the blow pin station 192, the mold 172 at the blow pin station 190 is translated to the extrusion station 188 to receive parisons, after which that mold 172 will shift in the direction of the arrow 206 back to the blow pin station 190 at which fluid/gas from a fluid/gas supply 204a is injected to expand the parisons in the same manner as occurs at the blow pin station 192.

The components 207, 208 incorporate overall system controls, molded part handling structure, and other structure that coordinates formation of the molded products from beginning to end. The details of the components 207, 208 are not critical to the present invention and will thus not be described herein. Those skilled in the art are familiar with the construction and operation of components 207, 208 that might take virtually a limitless number of different forms.

As can be seen in these Figures, the entire system 170 is designed to define a single row of cavities 178. The capacity of the system 170 is dictated primarily by its length, as indicated by the double-headed arrow 209. Increasing capacity of this type of system would require either an extension of its length, or the concurrent running of a like mold system occupying an independent footprint. In either event, the increase in product capacity significantly increases the required manufacturing space and footprint.

In FIGS. 16-38, one preferred form of extrusion blow mold system, according to the present invention, is shown at 210. The system 210 depicted is a shuttle-type, continuous extrusion type that incorporates independent mold units 212 that are depicted to have an identical configuration. This, however, is not a requirement. The mold units 212 are incorporated into an operating system 214 that consists of two independently movable, and operable, clamp units 216, 216a of like construction.

The system 210 further incorporates a parison delivery unit at 218 and a blow pin system at 220, 220a.

The system 210 further has a product movement system at 222 through which completed molded products 224 are delivered from the separate mold units 212 to a conveyor belt 226 that is advanced continuously in the direction of the arrow 228.

The cavities in the mold unit 212 are in a parallel configuration as are the cavities in the embodiments described hereinabove. As seen most clearly in FIGS. 21-24, the mold unit 212 has a first mold part 230 joined to a second mold part 232. The mold parts 230, 232 are united to move as one piece by at least one, and in this embodiment a plurality of, interconnecting guide bars 234.

The mold unit 212 further consists of a third mold part 236 that resides between the first and second mold parts 230, 232. The guide bars 234 extend fully through the third mold part 236. A fourth mold part 238 is joined to the third mold part 236 through at least one, and preferably a plurality of, guide bars 234a that interconnect the mold parts 236, 238 so that the mold parts 236, 238 move as one piece. The guide bars 234a extend fully through the second mold part 232.

Each of the mold parts 230, 232, 236, 238 has a substantially squared configuration with oppositely facing and parallel, flat surfaces. The first mold part 230 has oppositely facing first and second surfaces 240, 242, respectively, with the second mold part 232 having oppositely facing third and fourth surfaces 244, 246, respectively. The third mold part 236 has oppositely facing surfaces 248, 250, with the fourth mold part 238 having oppositely facing surfaces 252, 254.

Four cavity portions 256 are provided on the first mold part 230 through the surface 242. Of course, the number of cavities is not limited to four and could be greater than, or less than, four in number. A like number of complementary cavity portions 258 are provided on the third mold part 236 through the surface 248 thereon.

Cavity portions 260 are formed on the second mold part 232 through the surface 244, with complementary cavity portions 262 formed on the fourth mold part 238 through the surface 254 thereon.

Figure 16:
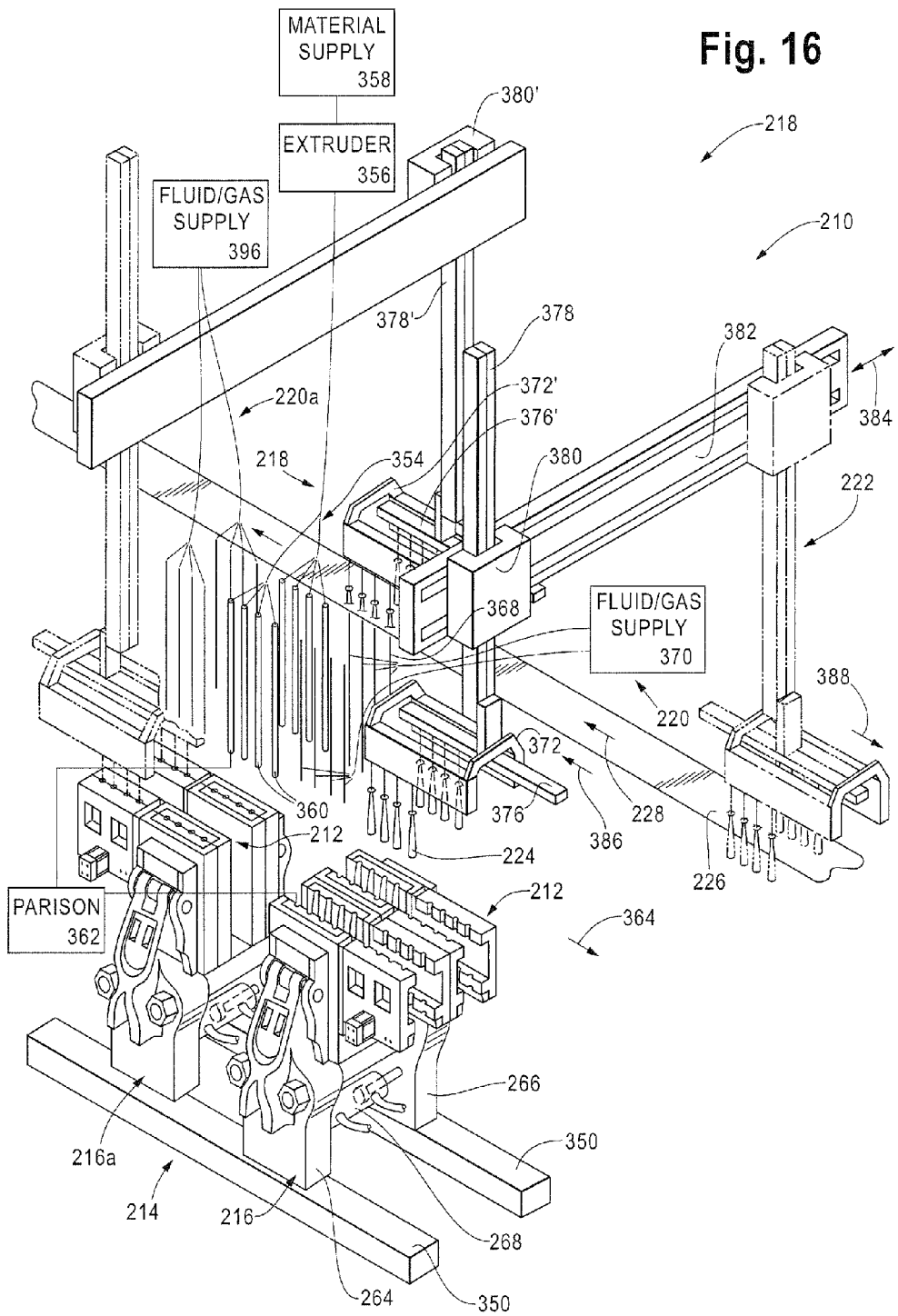
FIG. 16 is a perspective view of a shuttle-type extrusion blow mold system with a pair of mold units, according to the present invention, together with structure for separating molded products from the mold units and conveying them to a point of use.
Figure 21:
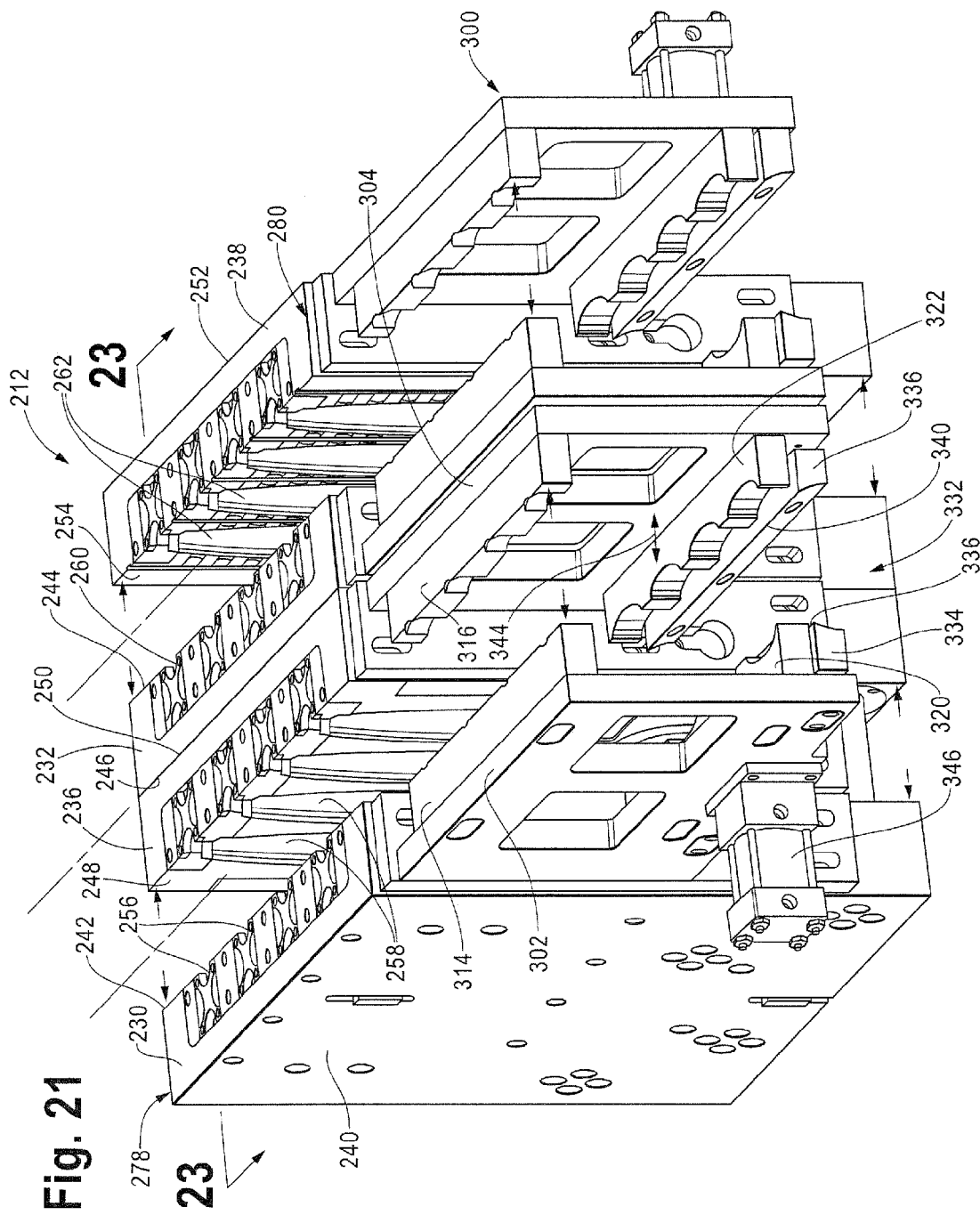
FIG. 21 is an enlarged, perspective view of the inventive mold unit in FIGS. 16 and 17 and shown in an open state.
Figure 22:
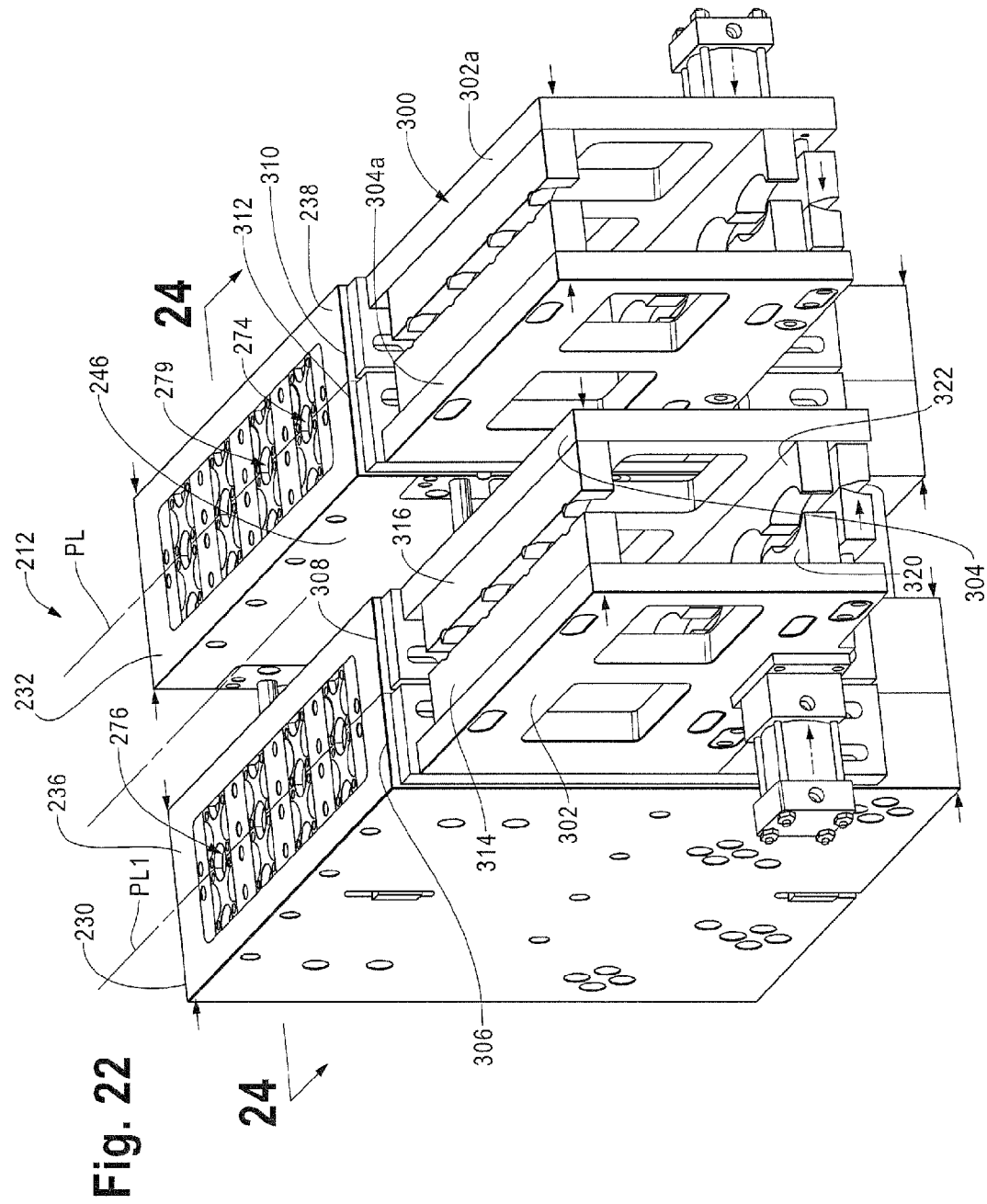
FIG. 22 is a view as in FIG. 21 with the mold unit in a closed state.
Figure 25:
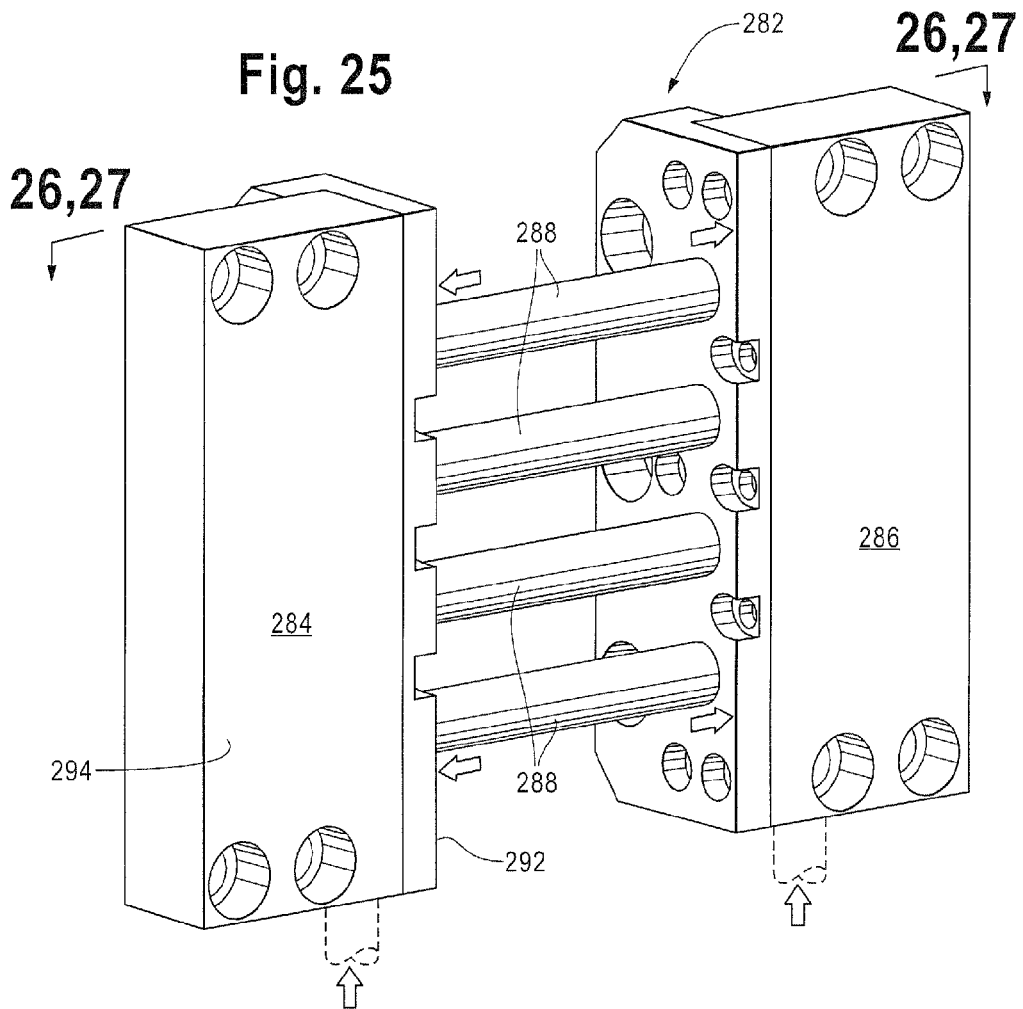
FIG. 25 is an enlarged, perspective view of a force applying mechanism to urge mold parts against each other during product formation and shown in an extended state.
Figure 26:
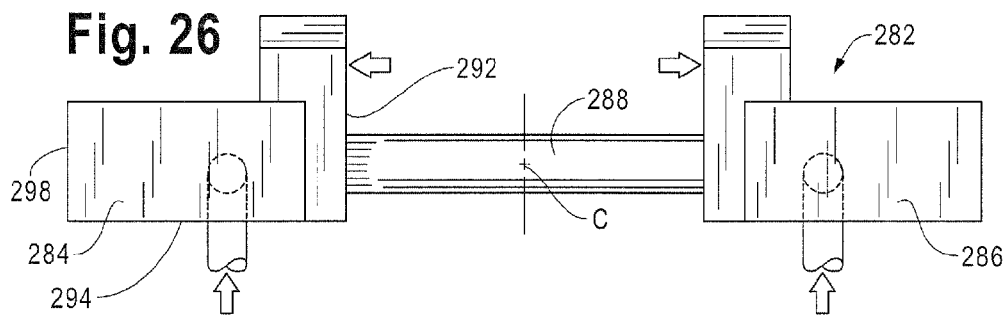
FIG. 26 is a plan view of the force applying mechanism in FIG. 25 in the extended state.
Figure 27:
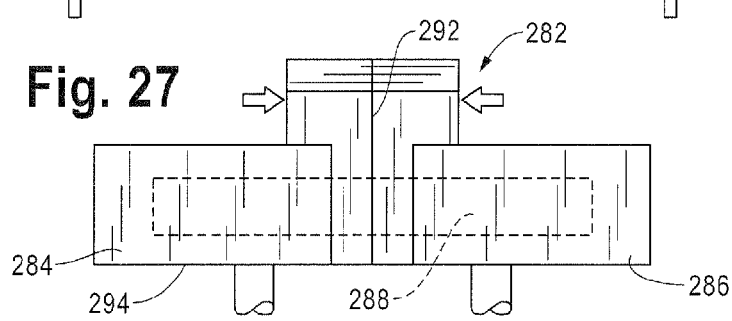
FIG. 27 is a view as in FIGS. 25 and 26 with the force applying mechanism in a retracted state.
Figure 28:
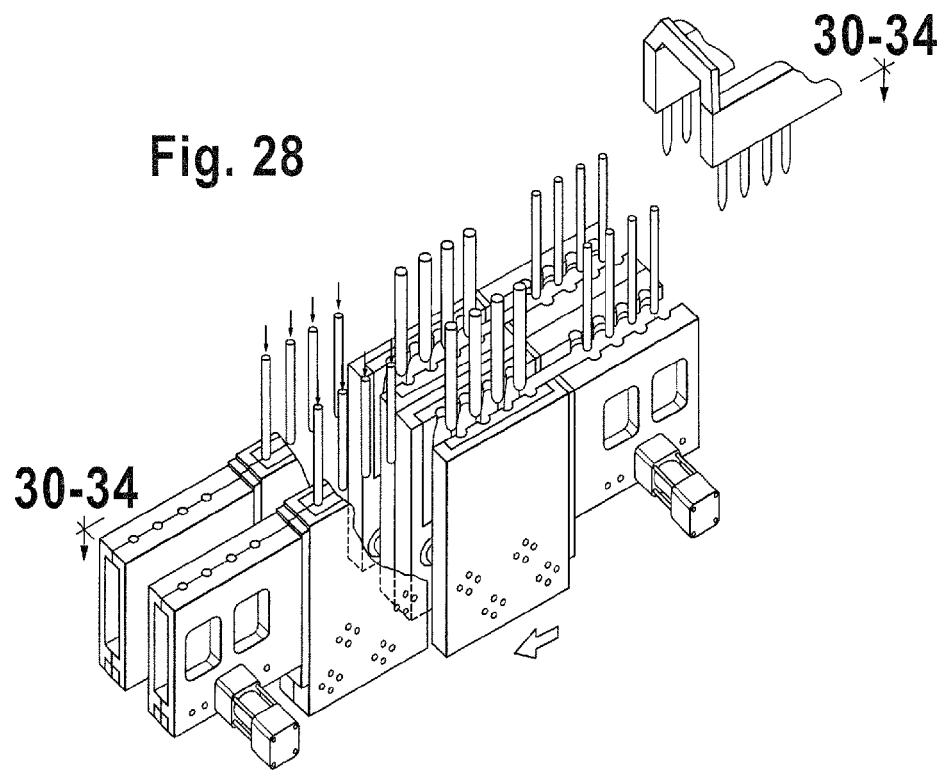
FIG. 28 is a fragmentary, perspective view of the separate mold units in FIGS. 16 and 17 in relationship to only some of the components in that system.

Through the operating system 214, the mold unit 212 is changed between a closed state, as shown in FIGS. 22 and 24, and for the "left" mold unit in FIG. 16, and an open state, as shown in FIGS. 21 and 23, and in FIG. 16 for the "right" mold unit 212 therein.

The exemplary clamp unit 216a consists of clamp parts 264, 266 between which the mold unit 212 resides with the mold unit 212 in an operative position.

With the right mold unit 212 in the open state, the clamp parts 264, 266 (see also FIG. 23) can be moved towards each other, bearing respectively on substantial areas of the surface 240 on the first mold part 230 and the surface 252 on the fourth mold part 238 and over a majority of the height thereof. This clamping action is produced by a cylinder 268 that cooperates between the clamp parts 264, 266. The precise configuration and operation of the cylinder 268 are not critical to the present invention, as many variations thereof are currently known in the industry.

As the clamping parts 264, 266 move towards each other, the interconnected mold parts 236, 238 move guidingly as a unit in a translational path portion in the direction of the arrow 270. The interconnected mold parts 230, 236 move as a unit guidingly in a path portion in an opposite direction, as indicated by the arrow 272. Once the closed state for the mold unit 212 is realized, the surfaces 244, 254 on the mold parts 232, 238, respectively, facially confront and abut so that the cavity portions 260, 262 combine to define closed cavities 274. The surfaces 244, 254 meet at a parting line PL that resides within a parting plane PP.

Similarly, with the mold unit 212 realizing the closed state, the surfaces 242 on the mold part 230 and 248 on the mold part 236 facially confront/abut so that the cavity portions 256, 258 cooperatively define closed cavities 276. The surfaces 242, 248 meet at a separate parting line PL1 that resides in a separate parting plane PP1.

As the mold unit 212 is changed between the closed and open states by the operating system 214, the mold parts 232, 238 move equal distances towards and away from the parting line PL, with the mold parts 230, 236 moving the same equal distance away from the parting line PL1 as the mold parts 230, 232, 236, 238 move in their respective paths in opposite directions. Accordingly, the parting lines PL, PL1 remain at all times fixed.

In this embodiment, the parting lines PL, PL1 are straight, parallel lines. However, while preferred, this is not required. Non-straight parting lines that may be curved or otherwise configured are contemplated within the scope of the invention.

As seen particularly in FIGS. 21 and 23, the region above the bottoms of the cavity portions 256, 258, 260, 262 is unobstructed between the mold part pairs 230, 236; 232, 238 fully between an upstream end 278 and a discharge end 280 for the molding section of the mold unit 212 defined by the mold parts 230, 232, 236, 238, for reasons that will be explained hereinbelow. To maintain these regions unobstructed, and at the same time permit the application of an adequate clamping force between mold part pairs 230, 236; 232, 238 with the mold unit 212 in its closed state, at least one, and in this configuration a pair of, force applying mechanisms 282 are incorporated.

As seen most clearly in FIGS. 23-27, each force applying mechanism 282 acts between the mold parts 232, 236 to urge the same away from each other and thereby urge the mold part 236 more positively against the mold part 230 and the mold part 232 more positively against the mold part 238 at upper regions thereon.

Each force applying mechanism 282 consists of separate blocks 284, 286. The block 284 is provided on the mold part 236, with the block 286 provided on the mold part 232. At least one, and in this case four, rods 288 extend between the blocks 284, 286.

The block 284 has an L-shaped construction and fits within a complementary receptacle 290 in the plate 236 so that transverse surfaces 292, 294 are respectively flush with the surface 250 and a transverse surface 296 at the discharge end of the mold part 236. A surface 298 on the block 284 may be flush with the surface 248 on the mold part 236.

The block 286 is mounted to the mold part 232 in a receptacle 290' in like fashion, with the structures being mirror images of each other.

The force applying mechanism 282 is hydraulically operated, though this is not required. The force applying mechanism 282 is changeable between extended and retracted states, as shown respectively in FIGS. 26 and 27, with the former coordinated to be achieved with the mold unit 212 in its closed state. As seen, each of the blocks 284, 286 is movable a corresponding distance towards and away from a lengthwise center C for the rods 288 as the force applying mechanism 282 is changed between extended and retracted states.

The overall system design will dictate the number of force applying mechanisms 282 appropriate and their particular constructions. Through the general operating principles described above, one skilled in the art could devise variations of this structure to achieve the desired ends.

As seen most clearly in FIGS. 21 and 22, the mold unit 212 further incorporates a product trimming section at 300. The trimming section 300 includes first and second trimming section plates 302, 304 connected at the discharge ends 306, 308 of the mold parts 230, 236, respectively, to move as one piece therewith. Corresponding plates 302a, 304a are provided at the discharge ends 310, 312 of the mold parts 238, 232, respectively, and function in identical manner.

The exemplary plate pair 302, 304, and their functions, will be described as representative of both plate pairs, with reference additionally to FIGS. 30'-32'.

With the mold unit 212 in the closed state, blocks 314, 316 on the plates 302, 304, respectively, cooperate to capture the necks 318 of four molded products 224 that have been shifted horizontally and parallel to and along the parting line PL1 while being maintained in their same molded orientations. Blocks 320, 322 capture the bottoms 324 of the molded products 224. The bottom surface 326 of each product 224 is flush with the bottom surfaces 328, 330 on the blocks 320, 322.

Beneath the blocks 320, 322, a trimmer assembly 332 is provided. The trimmer assembly 332 is changeable between a retracted state, as shown in FIG. 30', and a cutting state, as shown in FIG. 31. The trimmer assembly 332 consists of cutting blocks 334, 336, attached respectively to the plates 302, 304 directly beneath the blocks 320, 322. The cutting block 334 has a cutting edge 338, with the cutting block 336 having a cutting edge 340. The cutting blocks 334, 336 are configured to cooperatively define a downwardly opening receptacle 342 below the abutted cutting edges 338, 340.

The cutting block 336 is mounted to the plate 304 so as to be movable selectively towards and away from the plate 304, as indicated by the double-headed arrow 344, and is normally biased as by coil springs (not shown) slightly away from the plate 304 towards the plate 302. The cutting block 334 is mounted to the plate 302 so that it can be driven by an actuator 346 selectively towards and away from the plate 304.

With products 224 within the trimming section 300, and the mold unit 212 changed into the closed state, the cutting edges 338, 340 are moved towards each other and towards any centrally formed and depending flash 348 on the products 224. In this position, as shown in FIG. 30', the flash 348 resides in the receptacle 342.

By then advancing the cutting block 334 through the actuator 346, the flash 348 becomes pinched between the cutting edges 338, 340 and is severed as the abutted cutting edges 338, 340 shift further in the direction of the arrow 349, as depicted in FIG. 31'. This results in the severance of the flash 348 that can be disposed of in bulk after accumulating through repeated operating cycles.

An exemplary operating cycle will now be described for the system 210 with reference primarily to FIGS. 16 and 17 and the sequence drawings in FIGS. 29-34.

Figure 17:
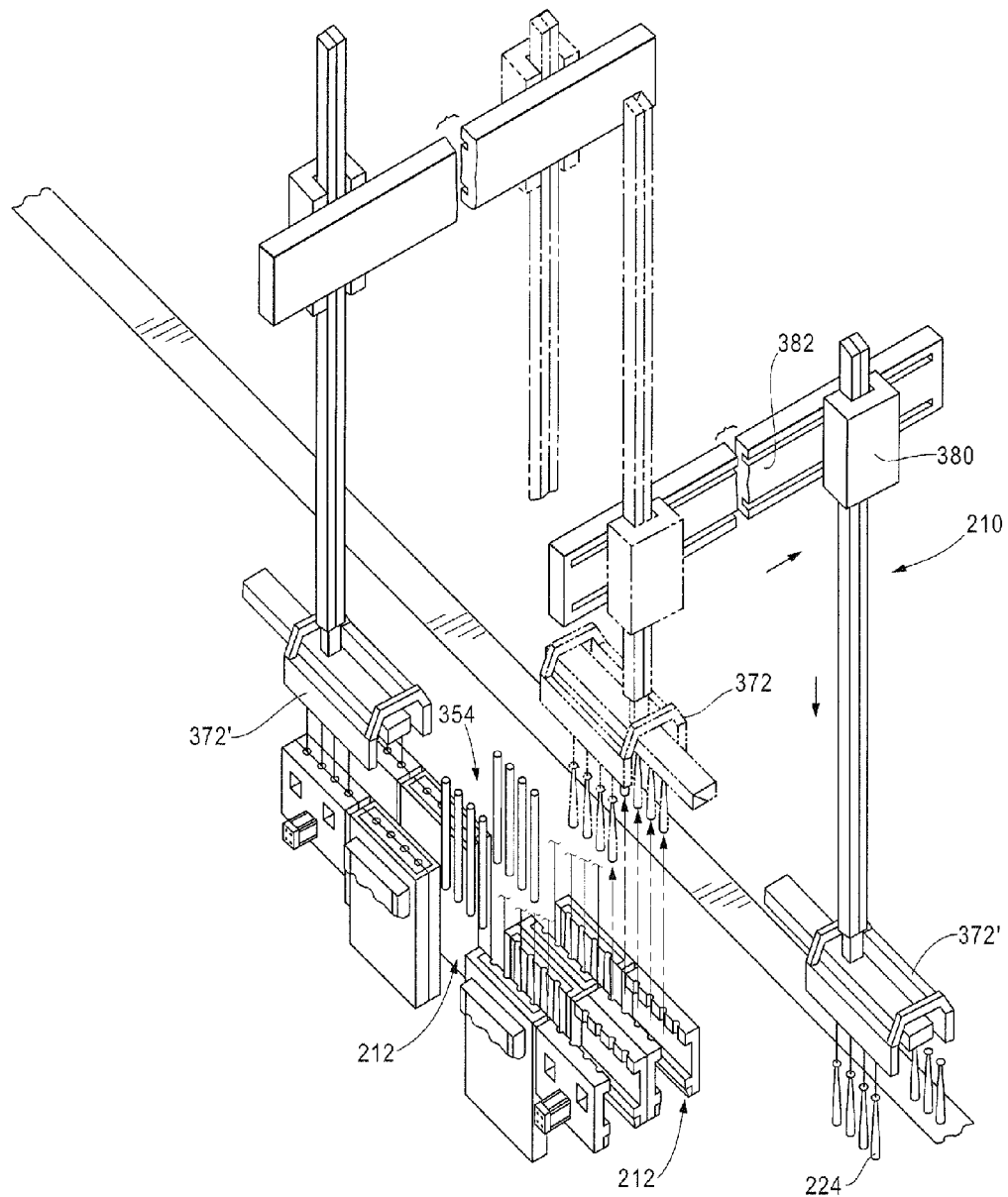
FIG. 17 is a view as in FIG. 16 with certain of the components in FIG. 16 removed.

In FIGS. 16 and 17, the clamp units 216, 216a are guidingly movable generally parallel to the direction of movement of molded products 224 on the conveyor belt 226. This movement is guided by spaced rails 350 supporting the clamp units 216, 216a. The precise structure for allowing this guided movement is not shown or described herein, as it is of a type well known to those skilled in the art.

In the shuttle-type procedure described hereinbelow, the product formation and handling is substantially the same on opposite (left and right) sides of an extrusion station 354 from the perspective of FIGS. 16 and 17. The description herein will be limited primarily to one exemplary mold unit 212 at the exemplary right side of the system 210 in FIGS. 16 and 17.

Figure 29:
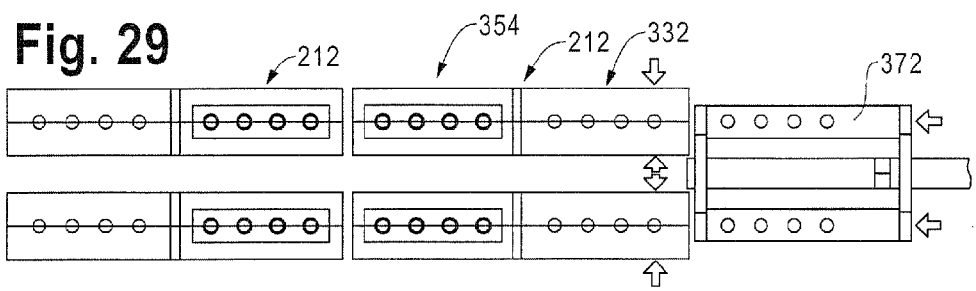
FIGS. 29-34 are schematic plan views sequentially showing the progressive product formation steps using the mold units in FIGS. 16, 17 and 28.

At the start of a cycle, the clamp unit 216a is shifted towards the left in FIG. 16, thereby permitting the right mold unit 212 on the clamp unit 216 to be shifted to the extrusion station 354, as seen in FIG. 29. With the mold unit 212 in a closed state, an extruder 356 delivers pourable material from a supply 358 through eight separate delivery tubes 360, alignable one each with the cavities 274, 276. A metered amount of the material is deposited as a parison 362, as shown in schematic form in FIG. 16.

Figure 30:
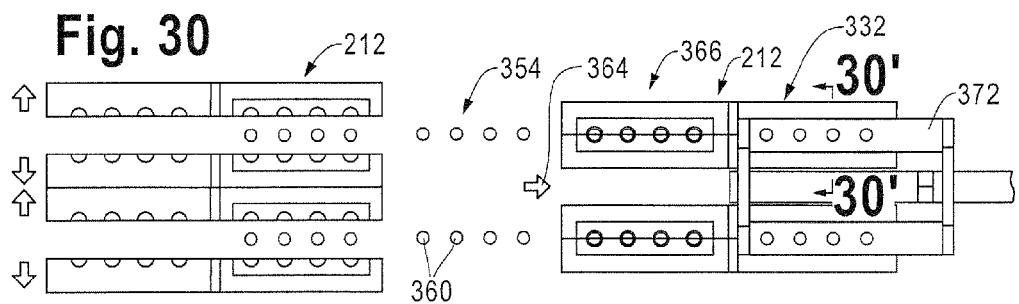
Figure 31:
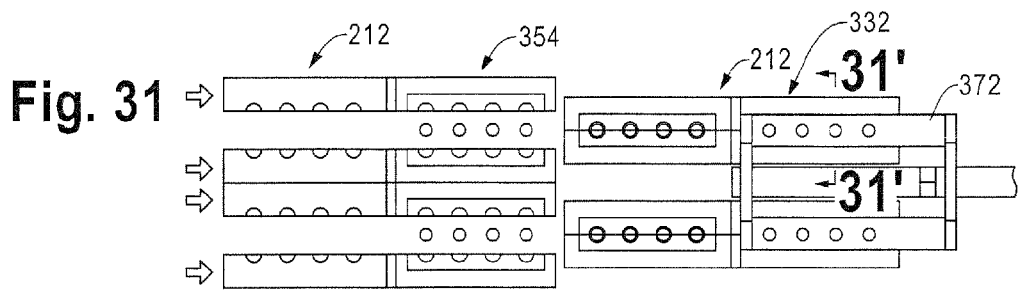
Figure 30:
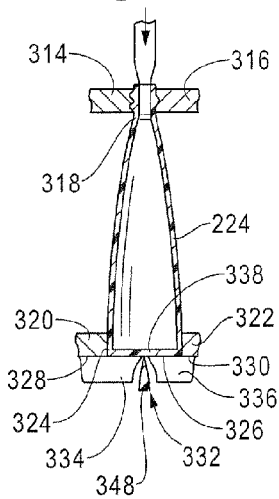
Figure 31:
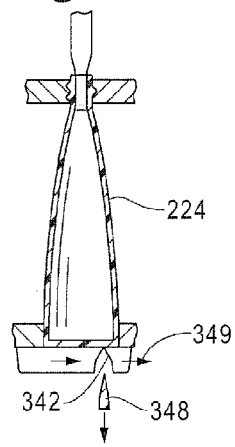

Once the parisons 362 are deposited, the right mold unit 312 is shifted in the direction of the arrow 364 in FIGS. 16 and 30 to reside at the blow pin station 220. At the blow pin station 220, blow pins 368 align one each with the cavities 274, 276 and are directed through the open top ends of the parisons 362. Fluid/gas under pressure from a supply 370 is delivered through the inserted blow pins 368 to thereby form the molded product through expansion within the cavities 274, 276.

Figure 32:
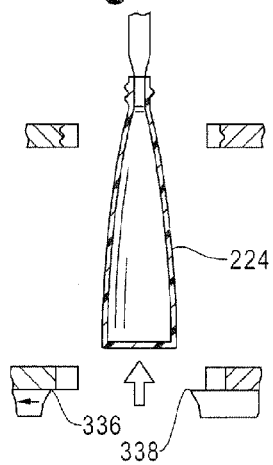
Figure 32:
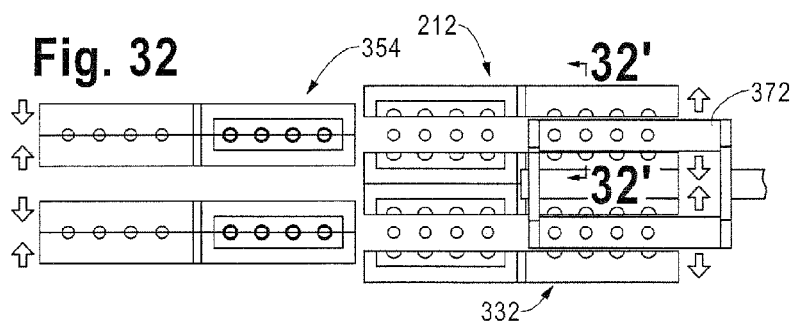

In FIGS. 31 and 32, the left mold unit 212 is present at the extruder station 354. Once the left mold unit 212 is shifted to its respective blow pin station 220, the right mold unit 212 is changed to an open state and shifted to the extruder station 354. As this occurs, the products 224 remain held by the blow pins 368 and are shifted to align with the trimmer assembly 332. Changing of the right mold unit 212 from the open state into the closed state causes the formed molded products 224 to be clamped at the trimmer assembly 332. The trimmer assembly 332 is then operated as shown sequentially in FIGS. 30'-32' to remove flash 348 from the molded products 224.

With the right mold unit 212 in this same position, the products 224 in the trimmer assembly 332 are situated to be picked up by a carrier saddle 372. The carrier saddle 372 has an inverted "U" shape with pickup pins 374 alignable one each with the molded products 224 in the trimmer assembly 332. The carrier saddle 372 is supported upon a horizontal beam 376 fixedly attached to the bottom of a vertical column 378. The column 378 is guided for vertical movement within a slide block 380 that is movable guidingly along a beam 382 in a line, indicated by the double-headed arrow 384, that is generally orthogonal to the conveying direction of the belt 226, as indicated by the arrow 228. Through an appropriate drive/control (not shown), the slide block 380 is translated so that the pickup pins 374 align over the products 224 as in FIGS. 30-32. The saddle 372 at this stage is shifted fully in one direction relative to the beam 376, as indicated by the arrow 386.

Figure 33:
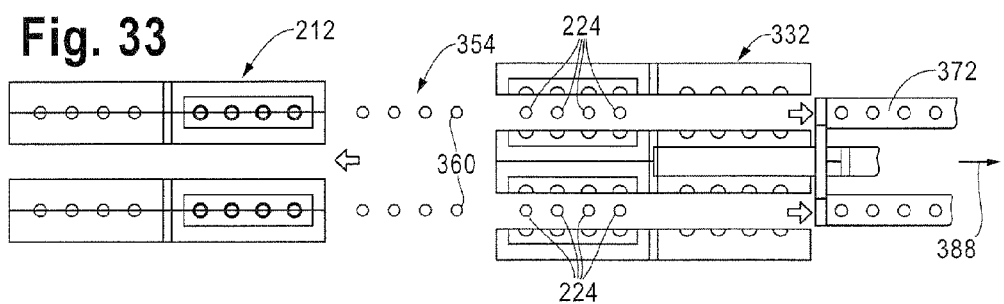
Figure 34:
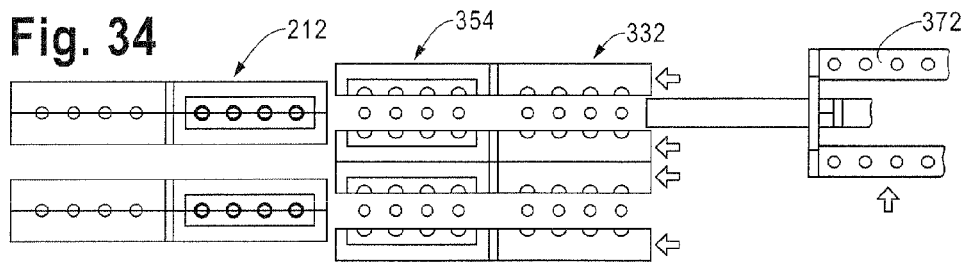

Once the carrier saddle 372 is lowered and the pickup pins 374 engage with the products 224 in the trimmer assembly 332 as in FIG. 31, the mold unit 212 can be changed to its open state as in FIG. 32 and the saddle 372 thereafter shifted as in FIG. 33 relative to the beam 376 in the direction of the arrow 388 to translate the engaged molded products 224 fully out of the trimmer assembly 332.

The column 378 can then be raised and the slide beam 380 translated to align one set S1 of the products 224, as shown in FIG. 18, with the upper surface 390 of the advancing conveyor belt 226. Once this set S1 of products 224 is released to be deposited on the conveyor belt 226, the saddle 372 is lifted, whereupon the first set S1 of products will move past the saddle 372 in a downstream direction. The saddle 372 can then be shifted in the direction of the arrow 392 and thereafter lowered to deposit a second set S2 of the products 224 on the conveyor surface 390 in the same line as the first set S1 of the products 224, as shown in FIG. 20.

With this arrangement, a continuous line of the products 224 can be deposited on the conveyor belt 226 for direction to an appropriate point of use 394, that may be a packaging location, staging location, or other appropriate location.

As noted above, the left mold unit 212 has a similar sequence of coordinated movements between the extrusion station 354 and blow pin station 220 on the left side of the extrusion station 354 during each operating cycle. A fluid/gas supply 396 for the blow pin station 220a on the left side of the extrusion station 354 may be independent, or part, of the fluid/gas supply 370.

A separate saddle 372' cooperates with the left mold unit 212 in the same manner as the saddle 372 cooperates with the right mold unit 212. That is, the saddle 372' is movable along a horizontal beam 376' and carried upon a column 378' that is vertically guided within a translatable slide block 380'.

In FIGS. 35-38, one particular structure is shown for attaching guide bars between the mold parts 230, 232, 236, 238. Since the guide bars 234, 234a are attached in similar fashion to their respective mold parts, one exemplary guide bar 234, and its attachment means, will be described to be representative of the other guide bars.

The guide bar 234 has spaced ends 398, 400. The guide bar 234 is directed fully through the mold part 236. The end 398 extends into a blind bore 401 through the surface 242 of the mold part 230. The opposite guide bar end 400 extends into a blind bore 402 through the surface 246 on the mold part 232. Fasteners 403 are directed through the surface 240 on the mold part 230 and into the guide bar end 398. Similar fasteners 403 are directed through the surface 244 of the mold part 232 into the guide bar end 400.

A bushing 404 has a main body 406 that is directed through the mold part 236. The bushing 404 has an enlarged flange 412 that is recessed through the surface 248 of the mold part 236 to be flush with that surface. Fasteners 414 are directed through flange bores 416 and into the mold part 236 to secure the bushing 404 in place.

Through this arrangement, the guide bars and associated bushings can be readily removed and replaced, as when they become worn or otherwise damaged.

In FIGS. 39 and 40, a mold unit 212' is shown incorporated into a conventional clamp unit 216' as designed to accept a conventional mold unit 220 with a single row of cavities.

As previously mentioned, this clamp unit 216' has, in the depicted embodiment, a guide bar 422 that blocks horizontal shifting of molded product, maintained in their molded orientations, through the discharge end 424 of the mold unit 212'.

Separate clamp parts 426, 428 are conventionally driven towards each other to effect clamping of the conventional mold unit 220. The mold unit 212' will fit in the same space as the mold unit 220 and is thus interchangeably mountable to allow selective use of either the mold unit 220 or the mold unit 212' without any structural reconfiguration. The only significant difference is that the clamping stroke is shortened by reason of the additional width of the mold unit 212' compared to the mold unit 220.

In this embodiment, the mold parts 230', 232', 236', 238' are shaped at the discharge end 424 to accommodate/conform to the guide bar 422. The upstream end 430 of the mold unit 212' is appropriately configured to accommodate a separate guide bar 432.

With this arrangement, the molded products 224 are separated from the mold unit 212' by being dropped down through and from the mold unit 212', as indicated by the arrow 434.

In this embodiment, shown slightly modified in FIG. 40, replaceable and removable wear inserts 436, 438, 440, 442 are respectively provided on the mold parts 230", 232", 236", 238".

The mold part 230" has oppositely facing surfaces 444, 446, with the mold part 232" having oppositely facing surfaces 448, 450. The mold part 436 is inset and defines part of the area of the surface 446, with the insert 438 likewise inset to define a part of the area of the surface 450.

The exemplary guide bar 422" has spaced ends 452 and 454.

The wear insert 436 is maintained against the mold part 230" by fasteners 456 directed through the surface 446 on the mold part 230".

Before installing the wear insert 436, a fastener 458 is directed through the insert surface 460 into the guide bar end 452 so that the fastener 458 is flush with the surface 460.

The foregoing disclosure of specific embodiments is intended to be illustrative of the broad concepts comprehended by the invention.

The invention claimed is:

1. An extrusion blow mold system comprising:
   a first mold part having a first plurality of cavity portions;
   a second mold part having a second plurality of cavity portions,
   the first mold part and second mold part interconnected to move as one piece in opposite directions in a first travel path;
   a third mold part having a third plurality of cavity portions;
   a fourth mold part having a fourth plurality of cavity portions,
   the third mold part and fourth mold part interconnected to move as one piece in opposite directions in a second travel path,
   the first, second, third and fourth mold parts together making up a first mold unit; and
   an operating system for the first mold unit through which: a) the first and second mold parts are moved guidingly relative to the third and fourth mold parts in the first travel path; and b) the third and fourth mold parts are moved guidingly relative to the first and second mold parts in the second travel path to thereby change the first mold unit between first and second states,
   the first and third mold parts meeting at a first parting line so that the cavity portions in the first plurality of cavity portions align one each with the cavity portions in the third plurality of cavity portions to define a first plurality of cavities, each to receive a parison with the first mold unit in the first state,
   the second and fourth mold parts meeting at a second parting line so that the cavity portions in the second plurality of cavity portions align one each with the cavity portions in the fourth plurality of cavity portions to define a second plurality of cavities, each to receive a parison, with the first mold unit in the first state,
   the mold parts relatively positioned through the operating system to place the first mold unit in the second state to allow molded products formed from the parisons to be released from their respective cavities,
   the extrusion blow mold system further comprising a force applying mechanism acting between the second and third mold parts to urge the second and third mold parts away from each other and thereby urge the second mold part against the fourth mold part and the third mold part against the first mold part with the first mold unit in the first state.

2. The extrusion blow mold system according to claim 1 wherein the first and third mold parts are moved away from each other and the first parting line as the first mold unit is changed from the first state into the second state.

3. The extrusion blow mold system according to claim 2 wherein the second and fourth mold parts are moved away from each other and the second parting line as the first mold unit is changed from the first state into the second state.

4. The extrusion blow mold system according to claim 1 wherein the first and second parting lines are straight, fixed lines that are substantially parallel and spaced from each other and the cavities in the first plurality of cavities are spaced from each other in a direction parallel to the parting lines.

5. The extrusion blow mold system according to claim 1 wherein the force applying mechanism comprises a rod that is extended with the first mold unit in the first state to move the second and third mold parts more positively against the fourth and first mold parts respectively.

6. The extrusion blow mold system according to claim 1 wherein the first, second, third and fourth mold parts are interconnected by at least one guide rod on the first mold unit and further in combination with a second mold unit having only two mold parts that are joined by at least one guide rod, wherein the first and second mold units are selectively operably mountable, one in place of the other, to the operating system and usable to form molded products with the selected mold unit.

7. The extrusion blow mold system according to claim 1 wherein the first and third mold parts each has a top and bottom, an upstream end and a discharge end, products molded in the first plurality of cavities have a molded orientation, and with the first mold unit in the second state there is no structure between the first and third mold parts that obstructs products molded in the first plurality of cavities and maintained in the molded orientation from moving along the first parting line to and past the discharge end of the first and third mold parts.

8. The extrusion blow mold system according to claim 7 wherein the cavity portions each has a bottom and there is no structure between the first and third mold parts above the bottoms of the cavity portions between the upstream and discharge ends of the first and third mold parts with the first mold unit in the second state.

9. The extrusion blow mold system according to claim 7 further comprising first and second trimming section plates respectively movable as one piece with, and at the downstream ends of, the first and third mold parts, the first and second trimming section plates configured to capture parts molded in the first plurality of cavities and maintained in the molded orientation with the first mold unit in the first state.

10. The extrusion blow mold system according to claim 9 wherein the extrusion blow mold system comprises at least one trimmer assembly that is changeable from a retracted state into a cutting state to thereby remove flash from molded parts captured between the first and second trimming section plates.

11. The extrusion blow mold system according to claim 1 wherein there is a plurality of guide bars that each extends through the third mold part and partially through each of the first and second mold parts.

12. An extrusion blow mold system comprising:
a first mold part having a first plurality of cavity portions;
a second mold part having a second plurality of cavity portions,
the first mold part and second mold part interconnected to move as one piece in opposite directions in a first travel path;
a third mold part having a third plurality of cavity portions;
a fourth mold part having a fourth plurality of cavity portions,
the third mold part and fourth mold part interconnected to move as one piece in opposite directions in a second travel path,
the first, second, third and fourth mold parts together making up a first mold unit; and
an operating system for the first mold unit through which the mold parts are moved in their respective travel paths to thereby change the first mold unit between first and second states,
the first and third mold parts meeting at a first parting line so that the cavity portions in the first plurality of cavity portions align one each with the cavity portions in the third plurality of cavity portions to define a first plurality of cavities, each to receive a parison with the first mold unit in the first state,
the second and fourth mold parts meeting at a second parting line so that the cavity portions in the second plurality of cavity portions align one each with the cavity portions in the fourth plurality of cavity portions to define a second plurality of cavities, each to receive a parison, with the first mold unit in the first state,
the mold parts relatively positioned through the operating system to place the first mold unit in the second state to allow molded products formed from the parisons to be released from their respective cavities,
wherein there is a plurality of guide bars that each extends through the third mold part and partially through each of the first and second mold parts,
wherein the first mold part has oppositely facing first and second surfaces and the second mold part has oppositely facing third and fourth surfaces, the first plurality of cavity portions formed at the second surface and the second plurality of cavity portions formed at the fourth surface,
wherein a first guide bar in the plurality of guide bars has spaced ends and one of the spaced ends is directed through the second surface into the first mold part,
wherein at least one fastener is directed through the first surface and into the one spaced end of the first guide bar and the other of the spaced ends is directed through the fourth surface into the second mold part,
wherein at least one fastener is directed through the third surface into the other of the spaced ends.

13. The extrusion blow mold system according to claim 12 wherein a bushing is provided on the third mold part and the first guide bar extends through the bushing.

14. The extrusion blow mold system according to claim 13 wherein the third mold part has oppositely facing surfaces, the bushing has an enlarged flange that is flush with one of the oppositely facing surfaces on the third mold part and at least one fastener is directed through the enlarged flange and into the third mold part to releasably maintain the bushing on the third mold part.

15. An extrusion blow mold system comprising:
a first mold part having a first plurality of cavity portions;
a second mold part having a second plurality of cavity portions,
the first mold part and second mold part interconnected to move as one piece in opposite directions in a first travel path;
a third mold part having a third plurality of cavity portions;
a fourth mold part having a fourth plurality of cavity portions,
the third mold part and fourth mold part interconnected to move as one piece in opposite directions in a second travel path,
the first, second, third and fourth mold parts together making up a first mold unit; and
an operating system for the first mold unit through which the mold parts are moved in their respective travel paths to thereby change the first mold unit between first and second states, the first and third mold parts meeting at a first parting line so that the cavity portions in the first plurality of cavity portions align one each with the cavity portions in the third plurality of cavity portions to define a first plurality of cavities, each to receive a parison with the first mold unit in the first state, the second and fourth mold parts meeting at a second parting line so that the cavity portions in the second plurality of cavity portions align one each with the cavity portions in the fourth plurality of cavity portions to define a second plurality of cavities, each to receive a parison, with the first mold unit in the first state, the mold parts relatively positioned through the operating system to place the first mold unit in the second state to allow molded products formed from the parisons to be released from their respective cavities, wherein a force applying mechanism acts between the second and third mold parts to urge the second and third mold parts away from each other and thereby urge the second mold part against the fourth mold part and the third mold part against the first mold part with the first mold unit in the first state, wherein the force applying mechanism comprises first and second blocks provided one each on the second and third mold parts with at least one rod extending between each of the first and second blocks.

16. The extrusion blow mold system according to claim 15 wherein the second and third mold parts have facing surfaces that confront each other with the first mold unit in the second state and the first and second blocks are mounted respectively in first and second receptacles formed one each through the facing surfaces on the second and third mold parts.

17. The extrusion blow mold system according to claim 16 wherein the force applying mechanism is hydraulically operated and changeable between extended and retracted states and the at least one rod is moved relative to each of the first and second blocks as the force applying mechanism is changed between the extended and retracted states.

18. The extrusion blow mold system according to claim 2 wherein the first and third mold parts are each moved away from the first parting line an equal first distance as the first mold unit is changed from the first state into the second state.

19. The extrusion blow mold system according to claim 18 wherein the second and fourth mold parts are each moved away from the second parting line the first distance as the first mold unit is changed from the first state into the second state.

20. An extrusion blow mold system comprising:
a first mold part having a first plurality of cavity portions;
a second mold part having a second plurality of cavity portions,
the first mold part and second mold part interconnected to move as one piece in opposite directions in a first travel path;
a third mold part having a third plurality of cavity portions;
a fourth mold part having a fourth plurality of cavity portions,
the third mold part and fourth mold part interconnected to move as one piece in opposite directions in a second travel path,
the first, second, third and fourth mold parts together making up a first mold unit; and
an operating system for the first mold unit through which the mold parts are moved in their respective travel paths to thereby change the first mold unit between first and second states,
the first and third mold parts meeting at a first parting line so that the cavity portions in the first plurality of cavity portions align one each with the cavity portions in the third plurality of cavity portions to define a first plurality of cavities, each to receive a parison with the first mold unit in the first state, the second and fourth mold parts meeting at a second parting line so that the cavity portions in the second plurality of cavity portions align one each with the cavity portions in the fourth plurality of cavity portions to define a second plurality of cavities, each to receive a parison, with the first mold unit in the first state, the mold parts relatively positioned through the operating system to place the first mold unit in the second state to allow molded products formed from the parisons to be released from their respective cavities, wherein there is a plurality of guide bars that each extends through the third mold part and partially through each of the first and second mold parts, wherein the first mold part has oppositely facing first and second surfaces and the second mold part has oppositely facing third and fourth surfaces, wherein the first plurality of cavity portions is formed at the second surface and the second plurality of cavity portions is formed at the fourth surface, wherein an inset wear insert defines a part of one of the second and fourth surfaces, wherein a first guide bar in the plurality of guide bars has spaced ends and one of the spaced ends is directed into the inset wear insert, wherein at least one fastener is directed through the inset wear insert into the one spaced end of the first guide bar.

21. The extrusion blow mold system according to claim 1 wherein the first plurality of cavities has a top and bottom and there is no structure extending between the first and third mold parts above the bottom of the first plurality of cavities.

22. The extrusion blow mold system according to claim 1 wherein the first and fourth mold parts have oppositely facing surfaces and further comprising first and second clamp parts that respectively engage the oppositely facing surfaces on the first and fourth mold parts and are movable towards and away from each other to change the state of the first mold unit, the first and second clamp parts respectively engaging substantial areas of the oppositely facing surfaces on the first and fourth mold parts.

23. The extrusion blow mold system according to claim 1 wherein the first and fourth mold parts have oppositely facing surfaces and further comprising first and second clamp parts that respectively engage the oppositely facing surfaces on the first and fourth mold parts and are movable towards and away from each other to change the state of the first mold unit, the first and fourth mold parts each having a height, the first and second clamp parts respectively engaging the oppositely facing surfaces on the first and fourth mold parts over a majority of the height of the first and fourth mold parts.

24. An extrusion blow mold system comprising:
a first mold part having a first plurality of cavity portions;
a second mold part having a second plurality of cavity portions,
the first mold part and second mold part interconnected to move as one piece in opposite directions in a first travel path;
a third mold part having a third plurality of cavity portions;
a fourth mold part having a fourth plurality of cavity portions,
the third mold part and fourth mold part interconnected to move as one piece in opposite directions in a second travel path, the first, second, third and fourth mold parts together making up a first mold unit; and
an operating system for the first mold unit through which:
a) the first and second mold parts are moved guidingly relative to the third and fourth mold parts in the first travel path; and b) the third and fourth mold parts are moved guidingly relative to the first and second mold parts in the second travel path to thereby change the first mold unit between first and second states,
the first and third mold parts meeting at a first parting line so that the cavity portions in the first plurality of cavity portions align one each with the cavity portions in the third plurality of cavity portions to define a first plurality of cavities, each to receive a parison with the first mold unit in the first state,
the second and fourth mold parts meeting at a second parting line so that the cavity portions in the second plurality of cavity portions align one each with the cavity portions in the fourth plurality of cavity portions to define a second plurality of cavities, each to receive a parison, with the first mold unit in the first state,
the mold parts relatively positioned through the operating system to place the first mold unit in the second state to allow molded products formed from the parisons to be released from their respective cavities,
wherein the first plurality of cavities has a top and bottom and there is no structure extending between the first and third mold parts above the bottom of the first plurality of cavities.

25. An extrusion blow mold system comprising:
a first mold part having a first plurality of cavity portions;
a second mold part having a second plurality of cavity portions,
the first mold part and second mold part interconnected to move as one piece in opposite directions in a first travel path;
a third mold part having a third plurality of cavity portions;
a fourth mold part having a fourth plurality of cavity portions,
the third mold part and fourth mold part interconnected to move as one piece in opposite directions in a second travel path,
the first, second, third and fourth mold parts together making up a first mold unit; and
an operating system for the first mold unit through which:
a) the first and second mold parts are moved guidingly relative to the third and fourth mold parts in the first travel path; and b) the third and fourth mold parts are moved guidingly relative to the first and second mold parts in the second travel path to thereby change the first mold unit between first and second states,
the first and third mold parts meeting at a first parting line so that the cavity portions in the first plurality of cavity portions align one each with the cavity portions in the third plurality of cavity portions to define a first plurality of cavities, each to receive a parison with the first mold unit in the first state,
the second and fourth mold parts meeting at a second parting line so that the cavity portions in the second plurality of cavity portions align one each with the cavity portions in the fourth plurality of cavity portions to define a second plurality of cavities, each to receive a parison, with the first mold unit in the first state,
the mold parts relatively positioned through the operating system to place the first mold unit in the second state to allow molded products formed from the parisons to be released from their respective cavities,
wherein the first and fourth mold parts have oppositely facing surfaces and further comprising first and second clamp parts that respectively engage the oppositely facing surfaces on the first and fourth mold parts and are movable towards and away from each other to change the state of the first mold unit, the first and second clamp parts respectively engaging substantial areas of the oppositely facing surfaces on the third and fourth mold parts.

\* \* \* \* \*